United States Patent
Kashiwase et al.

(10) Patent No.: US 8,320,495 B2
(45) Date of Patent: Nov. 27, 2012

(54) RADIO COMMUNICATION METHOD AND RADIO COMMUNICATION TERMINAL

(75) Inventors: Susumu Kashiwase, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 731 days.

(21) Appl. No.: 12/306,384

(22) PCT Filed: Jun. 28, 2007

(86) PCT No.: PCT/JP2007/063023
§ 371 (c)(1),
(2), (4) Date: Sep. 3, 2009

(87) PCT Pub. No.: WO2008/001858
PCT Pub. Date: Jan. 3, 2008

(65) Prior Publication Data
US 2010/0061480 A1   Mar. 11, 2010

(30) Foreign Application Priority Data
Jun. 29, 2006   (JP) .................................. 2006-180355

(51) Int. Cl.
*H04L 27/00* (2006.01)
(52) U.S. Cl. ..................................................... 375/295
(58) Field of Classification Search .................. 375/260, 375/285, 295; 455/522, 67.13, 115.3
See application file for complete search history.

(56) References Cited

U.S. PATENT DOCUMENTS

| | | | | |
|---|---|---|---|---|
| 6,154,659 | A * | 11/2000 | Jalali et al. | 455/522 |
| 6,230,022 | B1 | 5/2001 | Sakoda et al. | 455/522 |
| 6,678,257 | B1 | 1/2004 | Vijayan et al. | 370/320 |
| 7,245,935 | B2 * | 7/2007 | Lin | 455/522 |
| 2004/0081076 | A1 * | 4/2004 | Goldstein et al. | 370/208 |
| 2004/0176043 | A1 * | 9/2004 | Huh et al. | 455/67.13 |
| 2005/0124370 | A1 | 6/2005 | Nanda | 455/522 |
| 2009/0323637 | A1 * | 12/2009 | Kashiwase et al. | 370/331 |
| 2009/0325623 | A1 * | 12/2009 | Morita et al. | 455/522 |
| 2010/0003973 | A1 * | 1/2010 | Kashiwase et al. | 455/422.1 |
| 2010/0016010 | A1 * | 1/2010 | Kashiwase et al. | 455/522 |
| 2010/0029318 | A1 * | 2/2010 | Tano et al. | 455/522 |
| 2010/0323642 | A1 * | 12/2010 | Morita | 455/115.3 |

FOREIGN PATENT DOCUMENTS
JP   11-196043   7/1999
* cited by examiner

*Primary Examiner* — Khanh C Tran
(74) *Attorney, Agent, or Firm* — DLA Piper LLP (US)

(57) ABSTRACT

The present invention is summarized as a radio communication method including the steps of calculating a transmission power difference between a transmission power value of a first carrier and a transmission power value of a second carrier; determining whether or not the transmission power difference exceeds a threshold which indicates a maximum transmission power difference allowable between the first carrier and the second carrier; and decreasing a data rate for transmission via one of the first carrier and the second carrier that has the higher transmission power value when the transmission power difference exceeds the maximum transmission power difference.

10 Claims, 15 Drawing Sheets

| DATA RATES (bps) | OFFSET VALUES (dB) |
|---|---|
| 9.6k | 0dB |
| 19.2k | 3dB |
| 38.4k | 6dB |
| 76.8k | 9.5dB |
| 153.6k | 13dB |
| ⋮ | ⋮ |
| 1.8M | 30dB |

FIG. 12
(a)
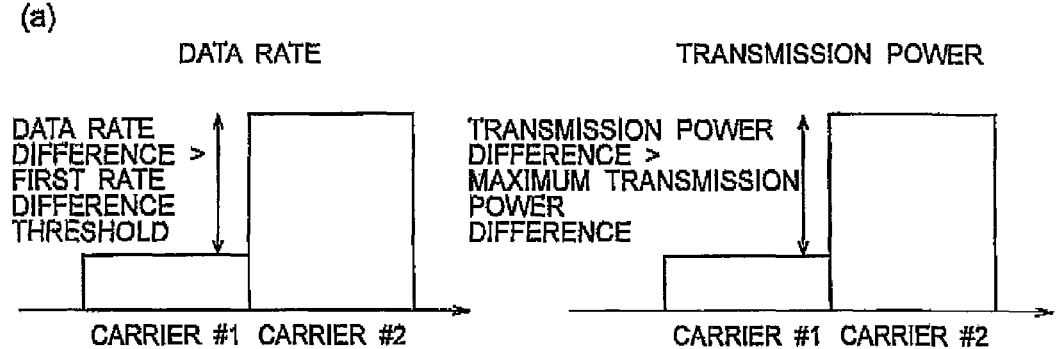
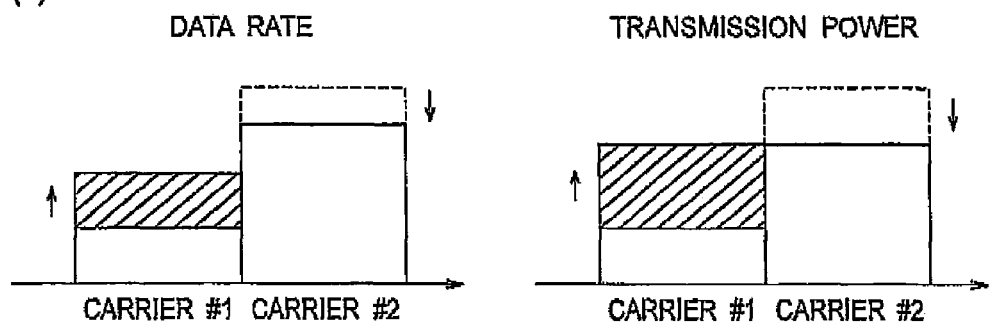
(b)

FIG. 13
(a)
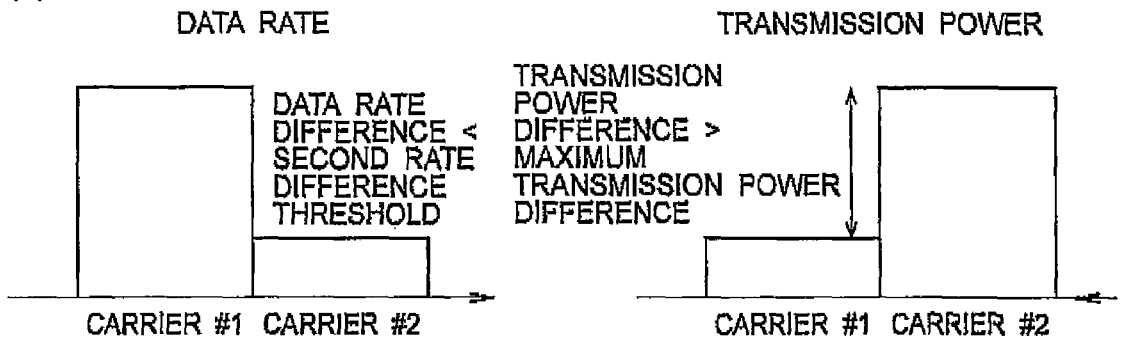
(b)
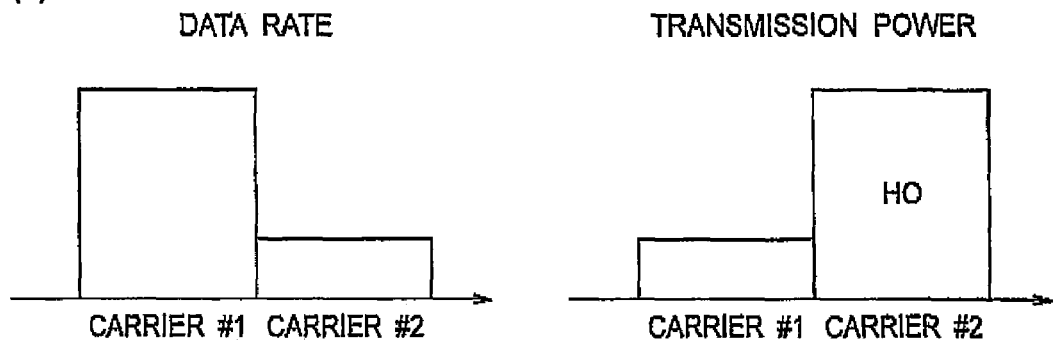

FIG. 14
(a)
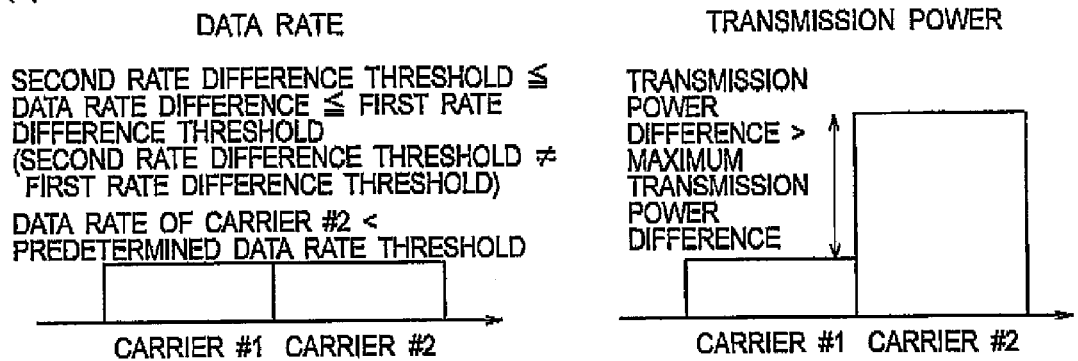
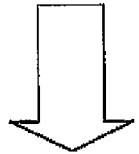
(b)
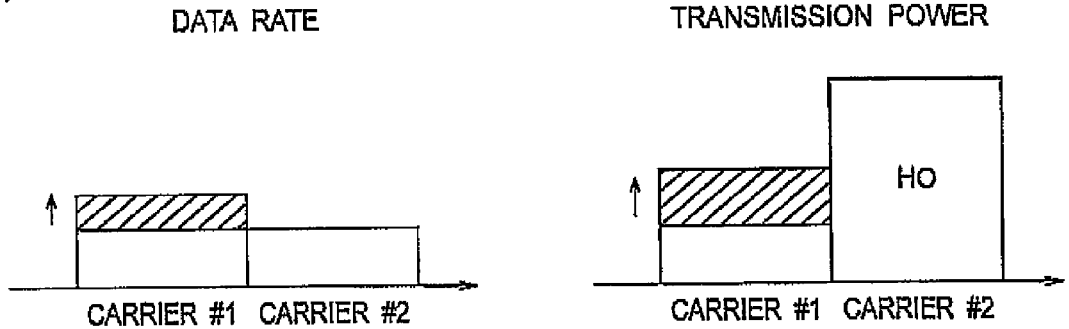

FIG. 15
(a)
DATA RATE
SECOND RATE DIFFERENCE THRESHOLD ≦
DATA RATE DIFFERENCE ≦
FIRST RATE DIFFERENCE THRESHOLD
(SECOND RATE DIFFERENCE THRESHOLD ≠
FIRST RATE DIFFERENCE THRESHOLD)
DATA RATE OF CARRIER #2 >
PREDETERMINED DATA RATE THRESHOLD
TRANSMISSION POWER
TRANSMISSION POWER
DIFFERENCE >
MAXIMUM TRANSMISSION
POWER
DIFFERENCE
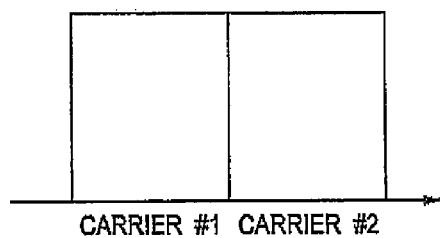
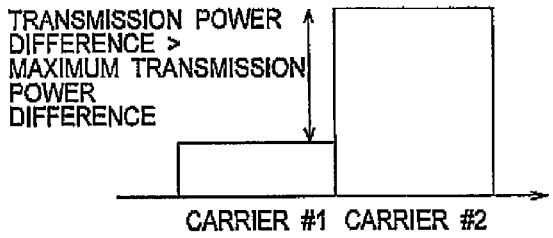
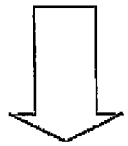
(b)
DATA RATE
TRANSMISSION POWER
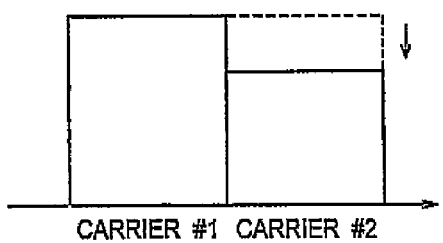
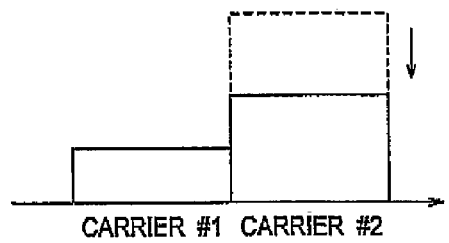

RADIO COMMUNICATION METHOD AND RADIO COMMUNICATION TERMINAL

CROSS-REFERENCE TO THE RELATED APPLICATIONS

This application is a national stage of international application No. PCT/JP2007/063023 filed Jun. 28, 2007, which also claims benefit of priority under 35 USC 119 to Japanese Patent Application No. 2006-180355 filed Jun. 29, 2006, the entire contents of which are incorporated herein by reference.

TECHNICAL FIELD

The present invention relates to a radio communication method in reverse link by multicarrier using multiple carriers, and also to a radio communication method and a radio communication terminal for performing communications by multicarrier.

BACKGROUND ART

In recent years, as applications, such as moving images or games, to be handled have been diversified and advanced, the data transmission rate in a mobile communication system has been strongly demanded to be speeded up. With such a background, the Third Generation Partnership Project 2 (3GPP2), for example, defines a scheme for implementing high speed data transmissions by using multiple carriers bundled in a upper layer (so-called multicarrier).

In the case of multicarrier, a radio communication terminal (Access Terminal) generally employs a configuration in which multiple carriers are transmitted by use of a single radio communication circuit, in view of downsizing, reduction in manufacturing cost or the like. Thus, in order to reduce interference between adjacent carriers that are adjacent to each other with a predetermined frequency interval (1.25 MHz interval), so it is provided that a transmission power difference between adjacent carriers should be within a predetermined threshold (MaxRLTxPwrDiff, 15 dB for example) (Non-patent document 1, for example).

Non-patent document 1 "cdma2000 High Rate Packet Data Air Interface 3GPP2 C.S0024-B Version 1.0", 3GPP2, June 2006

DISCLOSURE OF THE INVENTION

As described above, 3GPP2 provides that a transmission power difference between adjacent carriers be controlled to be within a predetermined threshold (MaxRLTxPwrDiff). In some cases, however, the transmission power difference cannot be maintained within the predetermined threshold under some communication conditions between a radio communication terminal and a radio base station (Access Network).

For example, when a radio communication terminal moves away from a first radio base station that is currently performing communications by use of a first carrier and simultaneously moves toward a second radio base station that is currently performing communications by use of a second carrier adjacent to the first carrier with a predetermined frequency interval, the radio communication terminal needs to increase the transmission power of the first carrier to maintain communications with the first radio base station using the first carrier. In addition, as the radio communication terminal comes closer to the second radio base station, it reduces the transmission power of the second carrier.

In this way, in some cases, the radio communication terminal may not be able to maintain the transmission power difference within the predetermined threshold to continue communications currently being performed with the first radio base station and the second radio base station.

Hence, the present invention was made in light of such the circumstances, and it is an objective of the present invention to provide a radio communication method and a radio communication terminal that are capable of maintaining communications by multicarrier, while preventing interference between adjacent carriers which are adjacent to each other with a predetermined frequency interval.

One characteristic of the present invention is summarized in that in a radio communication method in reverse link by multicarrier using at least a first carrier and a second carrier that is adjacent to the first carrier with a predetermined frequency interval, in which a transmission power value of the first carrier is set to decrease in accordance with decrease in a data rate of data to be transmitted via the first carrier, and a transmission power value of the second carrier is set to decrease in accordance with decrease in a data rate of data to be transmitted via the second carrier, the radio communication method including the steps of calculating a transmission power difference between the transmission power value of the first carrier and the transmission power value of the second carrier, determining whether or not the transmission power difference exceeds a threshold which indicates a maximum transmission power difference allowable between the first carrier and the second carrier, and when the transmission power difference exceeds the maximum transmission power difference, decreasing the data rate for transmission via one of the first carrier and the second carrier that has the higher transmission power value.

According to the characteristic, if the transmission power difference exceeds the maximum transmission power difference, reduction in the transmission power difference between adjacent carriers (the first carrier and the second carrier) is enabled by reducing the data rate of data to be transmitted via one of the first carrier and the second carrier that has a higher transmission power value.

Thus, communications by multicarrier can be maintained while interference between adjacent carriers that are adjacent to each other with a predetermined frequency interval is controlled.

One characteristic of the present invention is summarized in that, in the characteristics of the present invention as described above, in the step of calculating the transmission power difference, the transmission power difference is calculated in a predetermined cycle, the radio communication method further including the steps of: determining whether or not the transmission power difference has been expanding, on the basis of the transmission power difference calculated in the predetermined cycle; and when it is determined that the transmission power difference has been expanding, decreasing the data rate for transmission via one of the first carrier and the second carrier that has the higher value of the transmission power.

One characteristic of the present invention is summarized in that in the radio communication method in the reverse link by multicarrier using at least a first carrier and a second carrier that is adjacent to the first carrier with a predetermined frequency interval, in which a transmission power value of the first carrier is set to increase in accordance with increase in a data rate of data to be transmitted via the first carrier, and a transmission power value of the second carrier is set to increase in accordance with increase in a data rate of data to be transmitted via the second carrier, the radio communication method including steps of calculating a transmission power difference between the transmission power value of the first is carrier and the transmission power value of the second carrier; determining whether or not the transmission power difference exceeds a threshold which indicates a maximum transmission power difference allowable between the first carrier and the second carrier; and when the transmission power difference exceeds the maximum transmission power difference, increasing the data rate for transmission via one of the first carrier and the second carrier that has the lower transmission power value.

According to the characteristic, if the transmission power difference exceeds the maximum transmission power difference, reduction in the transmission power difference is enabled by increasing the data rate for transmission via one of the first carrier and the second carrier that has a lower transmission power value and by improving the data rate of the carrier having a lower transmission power value.

Thus, communications by multicarrier can be maintained while interference between adjacent carriers that are adjacent to each other with a predetermined frequency interval is controlled.

One characteristic of the present invention is summarized in that in the characteristic of the present invention as described above, in the step of calculating the transmission power difference, the transmission power difference is calculated in a predetermined cycle, the radio communication method further including the steps of: determining whether or not the transmission power difference has been expanding, on the basis of the transmission power difference calculated in the predetermined cycle; and when it is determined that the transmission power difference has been expanding, increasing the data rate for transmission via one of the first carrier and the second carrier that has the lower transmission power value.

One characteristic of the present invention is summarized in that in the characteristic of the present invention as described above, the radio communication method further includes a step of controlling a data rate of any one of the first carrier and the second carrier, on the basis of the data rate of the first carrier corresponding to the transmission power value of the first carrier and the data rate of the second carrier corresponding to the transmission power value of the second carrier.

One characteristic of the present invention is summarized so in that in a radio communication terminal for performing communications by multicarrier using at least a first carrier and a second carrier that is adjacent to the first carrier with a predetermined frequency interval, in which a transmission power value of the first carrier is set to decrease in accordance with decrease in a data rate of data to be transmitted via the first carrier, and a transmission power value of the second carrier is set to decrease in accordance with decrease in a data rate of data to be transmitted via the second carrier, the radio communication terminal including a transmission power difference calculator (transmission power difference calculator 22) configured to calculate a transmission power difference between the transmission power value of the first carrier and the transmission power value of the second carrier, a transmission power difference determination unit (transmission power difference calculator 22) configured to determine whether or not the transmission power difference calculated by the transmission power difference calculator exceeds a maximum transmission power difference allowable between the first carrier and the second carrier, and communication controller (communication controller 23) configured to decrease, when the transmission power difference determination unit determines that the transmission power difference exceeds the maximum transmission power difference, the data rate for transmission via one of the first carrier and the second carrier that has the higher transmission power value.

One characteristic of the present invention is summarized in that in the characteristic as described above, the transmission power difference calculator calculates the transmission power difference in a predetermined cycle, the radio communication terminal further including a power difference tendency determination unit (transmission power difference tendency determination unit 24) configured to determine whether or not the transmission power difference has been expanding, on the basis of the transmission power difference calculated by the transmission power difference calculator in the predetermined cycle, and when the power difference tendency determination unit determines that the transmission power difference has been expanding, the communication controller decreases the data rate to for transmission via one of the first carrier and the second carrier that has the higher transmission power value.

One characteristic of the present invention is summarized in that in a radio communication terminal for performing communications by multicarrier using at least a first carrier and a second carrier that is adjacent to the first carrier with a predetermined frequency interval, in which a transmission power value of the first carrier is set to increase in accordance with increase in a data rate of data to be transmitted via the first carrier, and a transmission power value of the second carrier is set to increase in accordance with increase in a data rate of data to be transmitted via the second carrier, the radio communication terminal including a transmission power difference calculator configured to calculate a transmission power difference between the transmission power value of the first carrier and the transmission power value of the second carrier, a transmission power difference determination unit configured to determine whether or not the transmission power difference calculated by the transmission power difference calculator exceeds a maximum transmission power difference allowable between the first carrier and the second carrier, and a communication controller configured to increase, when the transmission power difference determination unit determines that the transmission power difference exceeds the maximum transmission power difference, the data rate for transmission via one of the first carrier and the second carrier that has the lower transmission power value.

One characteristic of the present invention is summarized in that in the characteristic of the present invention as described above, the transmission power difference calculator calculates the transmission power difference in a predetermined cycle, the radio communication terminal further including a power difference tendency determination unit configured to determine whether or not the transmission power difference has been expanding, on the basis of the transmission power difference calculated by the transmission power difference calculator in the predetermined cycle, in the radio communication terminal, when the power difference tendency determination unit determines that the transmission power difference has been expanding, the communication controller increases the data rate for transmission via one of the first carrier and the second carrier that has the lower transmission power value.

One characteristic of the present invention is summarized in that in the characteristic as described above, the communication controller controls a data rate of any one of the first carrier and the second carrier, on the basis of the data rate of the first carrier corresponding to the transmission power so value of the first carrier and the data rate of the second carrier corresponding to the transmission power value of the second carrier.

According to the characteristics of the present invention, it is possible to provide a radio communication method and a radio communication terminal that can maintain communications by multicarrier while interference between adjacent carriers that are adjacent to each other with a predetermined frequency interval is controlled.

BRIEF DESCRIPTION OF THE DRAWINGS

FIG. 12 is a view showing one example of carrier control according to a third embodiment of the present invention (Pattern 1).

FIG. 13 is a view showing one example of carrier control according to the third embodiment of the present invention (Pattern 2).

FIG. 14 is a view showing one example of carrier control according to the third embodiment of the present invention (Pattern 3).

FIG. 15 is a view showing one example of carrier control according to the third embodiment of the present invention (Pattern 4).

BEST MODE FOR CARRYING OUT THE INVENTION

Figure 1:
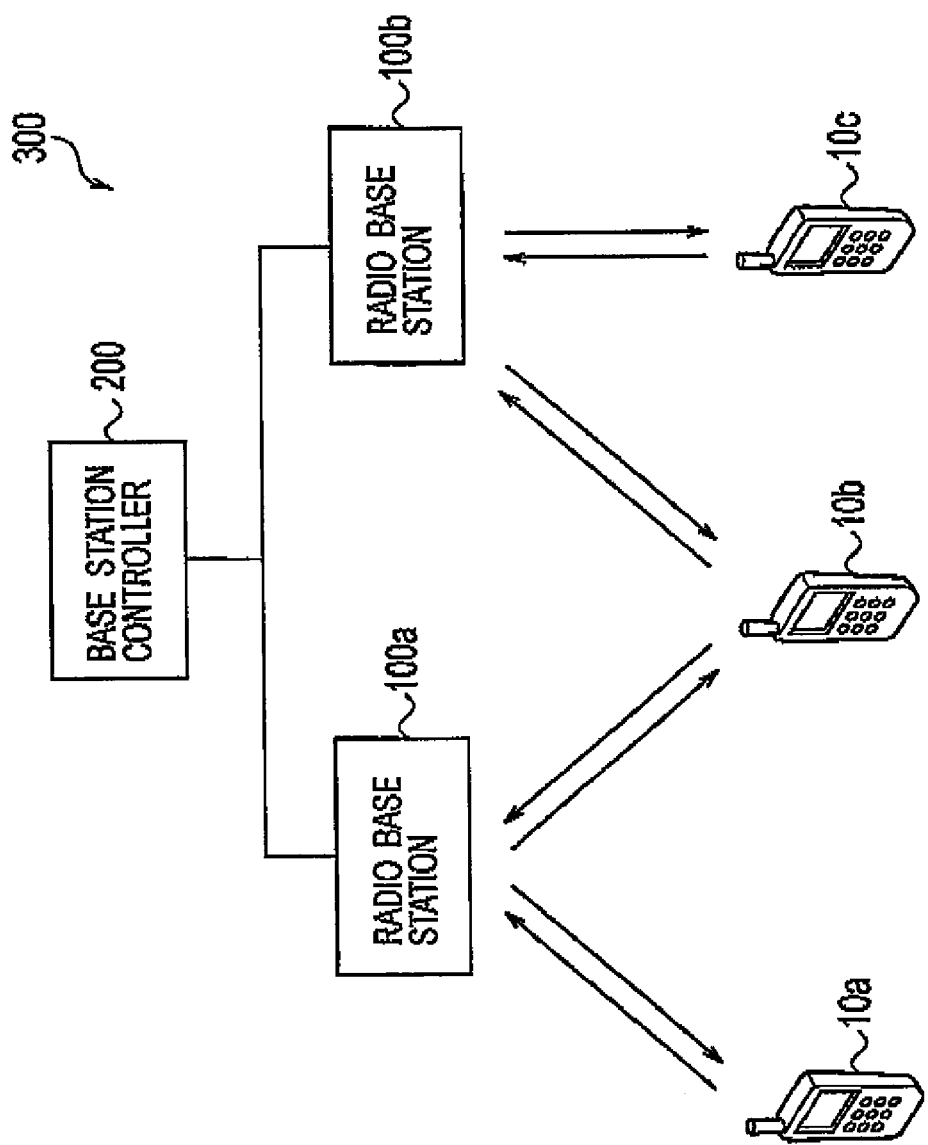
FIG. 1 is a view showing an overall schematic configuration of a communication system 300 according to a first embodiment of the present embodiment.

Next, embodiments of the present invention will be described. In the following description of the drawings, a same or similar reference numeral is given to a same or similar part. However, it should be noted that the drawings are schematic and the ratio of each dimension differs from actual ratio.

Thus, specific dimensions and the like are to be determined by referring to the following description. In addition, a relationship or a ratio of mutual dimensions may differ among the drawings, as a matter of course.

First Embodiment

Overall Schematic Configuration of Communication System

An overall schematic configuration of a communication is system according to a first embodiment of the present embodiment will be described hereinafter with reference to the drawings. FIG. 1 shows an overall schematic configuration of a communication system 300 according to the first embodiment of the present embodiment.

As shown in FIG. 1, the communication system 300 includes multiple radio communication terminals 10 (a radio communication terminal 10a to a radio communication terminal 10c), multiple radio base stations 100 (a radio base station 100a and a radio base station 100b), and a base station controller 200.

Each of radio communication terminals 10 transmits reverse link data to each of radio base stations 100 by using a reverse link frequency band assigned for transmitting the reverse link data. Specifically, the reverse link frequency band is divided into multiple carriers. Then, the radio communication terminal 10 transmits the reverse link data to the base radio station 100 by using the multiple carriers bundled in an upper layer (multicarrier).

In addition, the radio communication terminal 10 receives forward link data from a radio base station 100 by using a forward link frequency band assigned for transmitting the forward link data. Specifically, the forward link frequency band is divided into multiple carriers. Then, the radio communication terminal 10 receives the forward link data from the radio base stations 100 by using the multiple carriers bundled in an upper layer (multicarrier).

Note that the radio communication terminal 10, as in the case of the radio communication terminal 10a or the radio communication terminal 10c, may communicate with a single radio base station 100. In addition, the radio communication terminal 10 may communicate with multiple radio base stations 100, as in the case of the radio communication terminal 10b.

The radio base station 100 receives the reverse link data from the radio communication terminal 10 by using the reverse link frequency band assigned for transmitting the reverse link data. The radio base station 100 also transmits the forward link data to the radio communication terminals 10 by using the forward link frequency band assigned for transmitting the forward link data.

The base station controller 200 controls communications made between the radio communication terminals 10 and the radio base stations 100. The base station controller 200 performs operations such as handoff in which the radio communication terminal 10 switches a radio base station 100 for communicating therewith to the other.

In the communication system 300, the radio communication terminal 10 performs open loop control for controlling transmission power of reverse link data on the basis of reception power of forward link data received from the radio base station 100. The radio communication terminal 10 also performs closed loop control for controlling transmission power of reverse link data based on power control information received from the radio base station 100. The power control information herein is information that the radio base station 100 generates on the basis of reception quality (for example, signal to interference (SIR)) of the reverse link data received from the radio communication terminal 10.

In addition, in the communication system 300, the radio communication terminal 10 can change a data rate of reverse link data by changing a modulation method or an encoding method.

Additionally, the radio communication terminal 10 has a table in which a data rate of reverse link data is associated with an offset value. The radio communication terminal 10 adds the offset value corresponding to the data rate of the reverse link data, to the transmission power determined through the open loop control or the closed loop control.

More specifically, in the communication system 300, transmission power of reverse link data is set to be decreased in accordance with reduction of a date rate of the reverse link data. In contrast, the transmission power of reverse link data is set to be increased in accordance with increase in a data rate of the reverse link data.

(Reverse Link Frequency Band)

Figure 2:
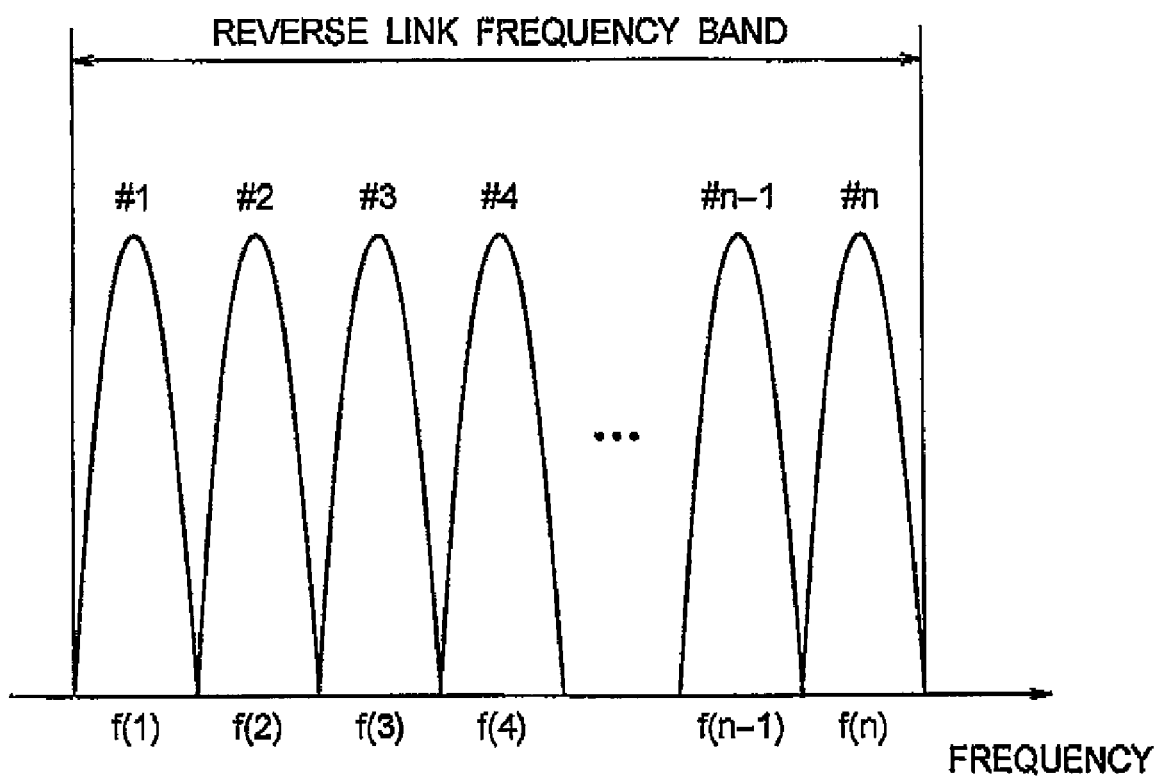
FIG. 2 is a view showing frequency bandwidth in reverse link according to the first embodiment of the present invention.

A reverse link frequency band according to the first embodiment of the present invention will be described hereinafter with reference to the drawings. FIG. 2 shows the reverse link frequency band according to the first embodiment of the present invention.

As shown in FIG. 2, the reverse link frequency band is divided into multiple carriers (carrier #1 to carrier #n). In addition, center frequencies of carriers are f(1) to f(n) respectively. The center frequencies of the respective carriers are adjacent to each other being spaced apart at a predetermined frequency interval (e.g., 1.25 MHz). Two carriers having their center frequencies being adjacent to each other will be hereinafter referred to as adjacent carriers.

(Configuration of Radio Communication. Terminals)

Figure 3:
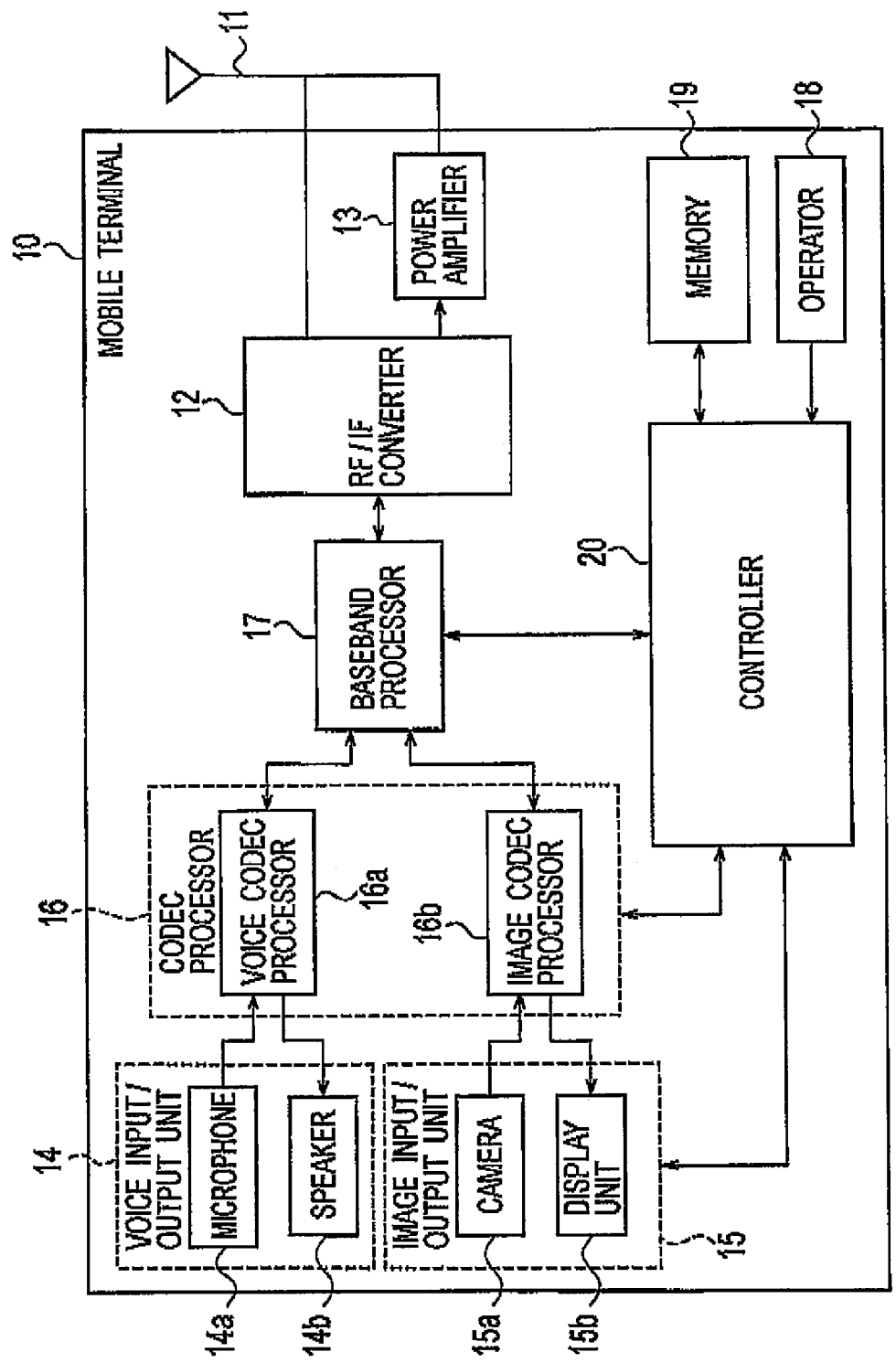
FIG. 3 is a block configuration diagram of a radio communication terminal 10 according to the first embodiment of the present invention.

A configuration of the radio communication terminal according to the first embodiment of the present invention will be described hereinafter with reference to the drawings. FIG. 3 is a block configuration diagram showing the radio communication terminal 10 according to the first embodiment of the present invention. Since the radio communication terminals 10a to 10c have similar configurations, they will be collectively referred to as a radio communication terminal 10 in the following description.

As shown in FIG. 3, the radio communication terminal 10 includes an antenna 11, an RF/IF converter 12, a power amplifier 13, a voice input/output unit 14, an image input/output unit 15, a codec processor 16, a baseband processor 17, an operator 18, a memory 19, and a controller 20.

The antenna 11 receives a signal (a reception signal) transmitted by the radio base stations 100. The antenna 11 also transmits a signal (a transmission signal) to the radio base station 100.

The RF/IF converter 12 converts a frequency (Radio Frequency (RF)) of a reception signal received by the antenna 11 into a frequency (Intermediate Frequency (IF)) to be handled by the baseband processor 17. The RF/IF converter 12 also converts the frequency (IF) of a transmission signal acquired from the baseband processor 17 into the frequency (RF) to be used in radio communications. In addition, the RF/IF converter 12 inputs the transmission signal converted into the radio frequency (RF) to the power amplifier 13.

The power amplifier 13 amplifies the transmission signal acquired from the RF/IF converter 12. The amplified transmission signal is inputted to the antenna 11.

The voice input/output unit 14 has a microphone 14a for collecting voice and a speaker 14b for outputting voice. The microphone 14a inputs a voice signal into the codec processor 16 on the basis of the collected voice. The speaker 14b outputs voice on the basis of the voice signal acquired from the codec processor 16.

The image input/output unit 15 includes a camera 15a for capturing an object, and a display unit 15b for displaying characters or images, etc. The camera 15a inputs an image signal to the codec processor 16 on the basis of captured images (still images and moving images). The display unit 15b displays images on the basis of the image signal acquired from the codec processor 16. The display unit 15b also displays characters to be inputted through the operator 18.

The codec processor 16 includes: a voice codec processor 16a for encoding and decoding a voice signal according to a predetermined encoding scheme (EVRC (Enhanced Variable Rate Codec) AMR (Advanced Multi Rate Codec) or G.729 compliant with ITU-T, for example); and an image codec processor 16b for encoding and decoding an image signal according to a predetermined encoding scheme (MPEG-4 etc, for example).

The voice codec processor 16a encodes a voice signal acquired from the voice input/output unit 14. The voice codec processor 16a also decodes a voice signal acquired from the baseband processor 17. The image codec processor 16b encodes an image signal acquired from the image input/output unit 15. The image codec processor 16b also decodes an image signal acquired so from the baseband processor 17.

The baseband processor 17 modulates a transmission signal or demodulates a reception signal according to a predetermined modulation scheme (QPSK or 16QAM), or the like. Specifically, the baseband processor 17 modulates a baseband signal such as a voice signal or an image signal acquired from the codec processor 16. The modulated baseband signal (transmission signal) is inputted into the RF/IF converter 12. The baseband processor 17 also demodulates a reception signal acquired from the RF/IF converter 12. The demodulated reception signal (baseband signal) is inputted into the codec processor 16.

The baseband processor 17 modulates information generated by the controller 20. The modulated information (transmission signal) is inputted into the RF/IF converter 12. The baseband processor 17 also demodulates a reception signal acquired from the RF/IF converter 12. The demodulated reception signal is inputted into the controller 20.

The operator 18 is a group of keys consisting of input keys for allowing characters, digits, or the like to be inputted, a response key for responding to incoming communications (calling), or a calling key for calling (originating a call), etc. In addition, when each key is pressed, the operator 18 allows an input signal corresponding to the pressed key to be inputted to the controller 20.

The memory 19 stores a program for controlling operation of the radio communication terminal 10, various types of data such as history of originated/received calls, an address book, etc. The memory 19 is formed of a flash memory that is a nonvolatile semiconductor memory, or a SRAM (Static Random Access Memory) that is a volatile semiconductor memory, etc.

Figures 4, 5:
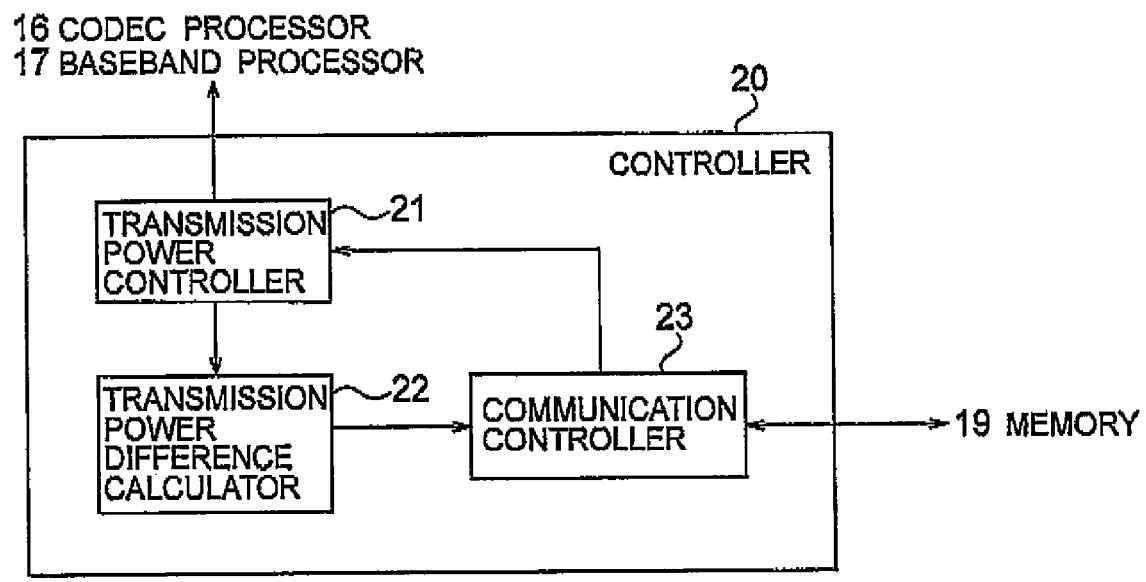
FIG. 4 is a view showing one example of a table stored in a memory 19 according to the first embodiment of the present invention.
FIG. 5 is a functional block diagram of a controller 20 according to the first embodiment of the present invention.

Now, as shown in FIG. 4, the memory 19 has a table in which a data rate of reverse link data is associated with an offset value. For example, when a data rate of reverse link data is 9.6 kbps an initial value), an offset value is not added to transmission power determined by the open loop control or the closed loop control. On the one hand, when the data rate of the reverse link data is 153.6 kbps, the offset value (13 dB)

is added to the transmission power determined by the open loop control or the closed loop control.

The controller 20 controls operation of the radio communication terminal 10 (the image input/output unit 15, the codec processor 16, the baseband processor 17, etc.) according to the program stored in the memory 19.

A configuration of the controller according to the first embodiment of the present invention will be described hereinafter with reference to the drawings. FIG. 5 is a functional block diagram showing the controller 20 according to one embodiment of the present invention.

As shown in FIG. 5, the controller 20 includes a transmission power controller 21, a transmission power difference calculator 22, and a communication controller 23.

The transmission power controller 21 controls transmission power of reverse link data for each carrier. Specifically, the transmission power controller 21 controls the transmission power of the reverse link data on the basis of reception quality (SIR, for example) of forward link data received from the radio base station 100 to which reverse link data is transmitted (open loop control).

The transmission power controller 21 also controls transmission power of reverse link data on the basis of power control information received from the radio base stations 100 to which reverse link data is transmitted (closed loop control). As described above, the power control information is information that the radio base station 100 generates on the basis of reception quality (SIR, for example) of the reverse link data. The power is control information requires the decrease or the increase of the transmission power for the reverse link data.

Furthermore, the transmission power controller 21 adds an offset value that the communication controller 23 determines according to a data rate of reverse link data, to the transmission power of the reverse link data determined by the open loop control or the closed loop control.

The transmission power difference calculator 22 calculates a transmission power difference of reverse link data (hereinafter referred to as a transmission power difference) between adjacent carriers. In addition, the transmission power difference calculator 22 determines whether or not a transmission power difference between adjacent carriers exceeds a maximum transmission power difference (MaxRLTxPwrDiff) to be allowed between adjacent carriers. When the transmission power difference between adjacent carriers exceeds a maximum transmission power difference, the transmission power difference calculator 22 informs the communication controller 23 of the fact that the transmission power difference between the adjacent carriers has exceeded the maximum transmission power difference.

The communication controller 23 determines a data rate of reverse link signal according to wireless condition (amount of delay, for example) between the radio communication terminal 10 and the radio base stations 100, to a type of application, or the like. The communication controller 23 instructs the baseband processor 17 to change a modulation scheme according to the determined data rate, or instructs the codec processor 16 to change an encoding scheme according to the determined data rate.

Additionally, when being informed of the fact that the transmission power difference between the adjacent carriers has exceeded the maximum transmission power difference, the communication controller 23 changes the data rate of the reverse link signal and simultaneously determines an offset value corresponding to the changed data rate referring to a table stored in the memory 19.

Specifically, the communication controller 23 reduces a data rate of reverse link signal to be transmitted via one of the adjacent carriers that has higher transmission power, and determines an offset value corresponding to the reduced data rate.

Additionally, the communication controller 23 may increase a data rate of reverse link signal to be transmitted via one of the adjacent carriers that has lower transmission power, and may determine an offset value corresponding to the increased data rate.

(Operation of Radio Communication Terminals)

Figure 6:
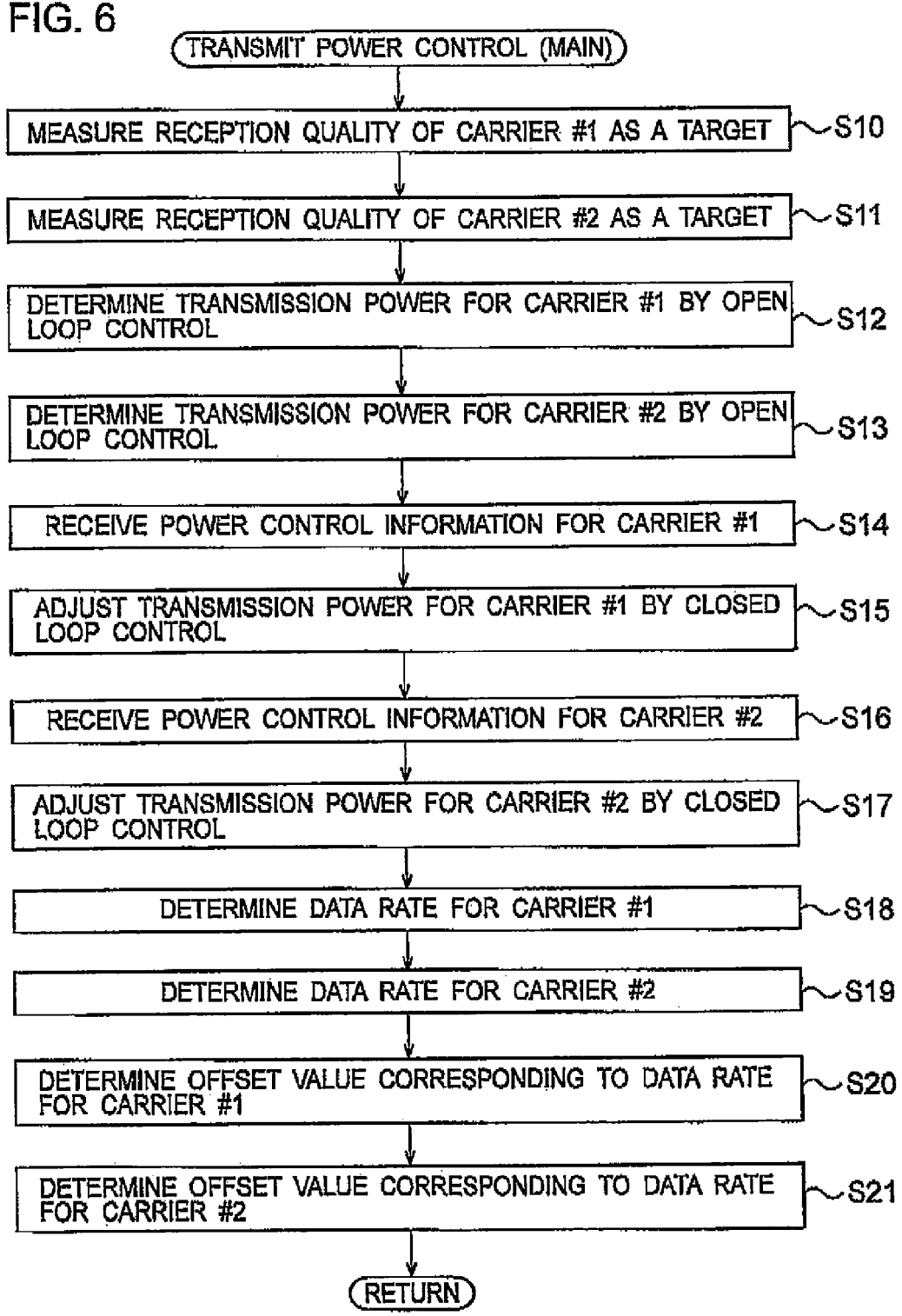
FIG. 6 is a flowchart showing operation of the radio communication terminal 10 according to the first embodiment of the present invention (Pattern 1).
Figure 7:
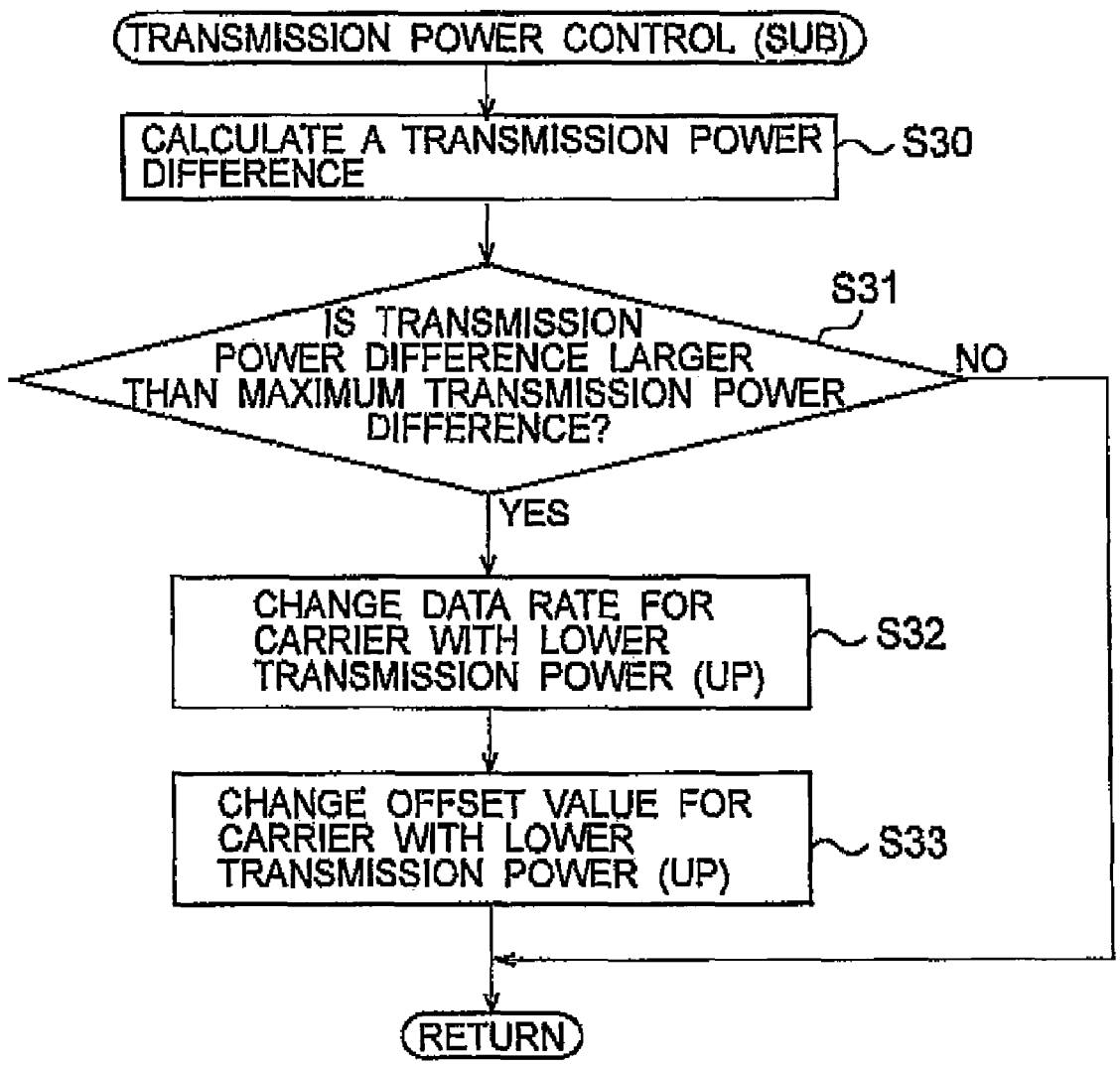
FIG. 7 is a flowchart showing the operation of the radio communication terminal 10 according to the first embodiment of the present invention (Pattern 2).
Figure 8:
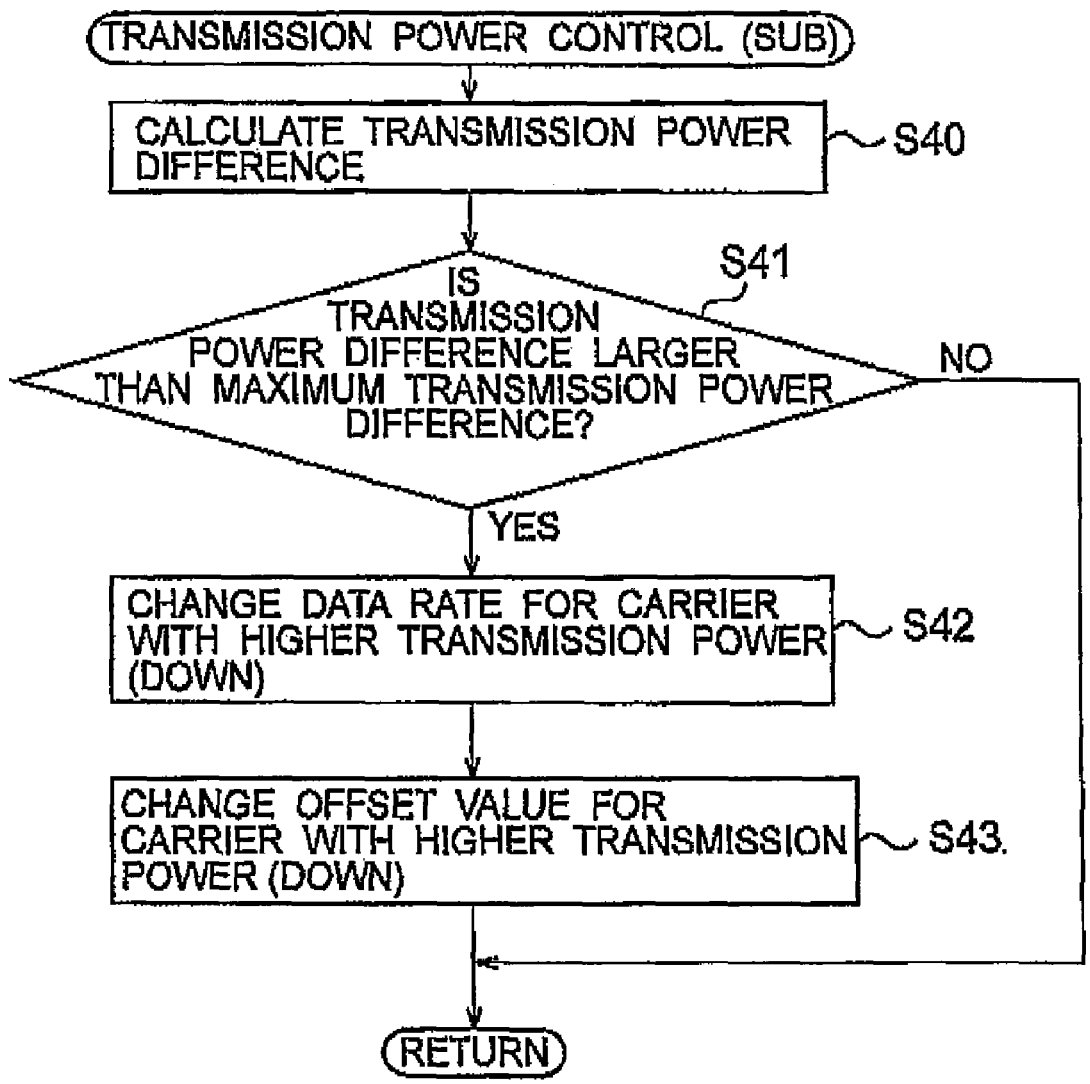
FIG. 8 is a flowchart showing the operation of the radio communication terminal 10 according to the first embodiment of the present invention (Pattern 3).

The operation of the radio communication terminal according to the first embodiment of the present invention will be described hereinafter with reference to the drawings. FIG. 6 to FIG. 8 are flowcharts of the operation of the radio communication terminal 10 according to the first embodiment of the present invention.

Hereinafter, the case where adjacent carriers are a carrier #1 and a carrier #2 will be described as an example. In addition, the radio communication terminal 10 transmits reverse link data to the radio base station 100a by using the carrier #1 and transmits reverse link data to the radio base station 100b by using the carrier #2.

First, a main processing of controlling transmission power will be described with reference to FIG. 6. The main processing of controlling transmission power is repeatedly performed in a predetermined cycle.

As shown in FIG. 6, in step 10, the radio communication terminal 10 measures reception quality of forward link data targeting the carrier #1. Specifically, the radio communication terminal 10 measures the reception quality of forward link data so received from the radio base station 100a to which reverse link data is to be transmitted by using the carrier #1.

In step 11, the radio communication terminal 10 measures reception quality of forward link data targeting the carrier #2. Specifically, the radio communication terminal 10 measures the reception quality of forward link data received from the radio base station 100b to which reverse link data is to be transmitted by using the carrier #2.

In step 12, the radio communication terminal 10 determines transmission power of the reverse link data to be transmitted by using the carrier #1, through the open loop control. Specifically, the radio communication terminal 10 determines the transmission power of the reverse link data to be transmitted by the carrier #1, on the basis of the reception quality measured in the step 10.

In step 13, the radio communication terminal 10 determines transmission power of the reverse link data to be transmitted by using the carrier #2, through the open loop control. Specifically, the radio communication terminal 10 determines the transmission power of the reverse link data to be transmitted by the carrier #2, on the basis of the reception quality measured in the step 11.

In step 14, the radio communication terminal 10 receives power control information for the carrier #1. Specifically, the radio communication terminal 10 receives the power control information from the radio base station 100a to which reverse so link data is to be transmitted by using the carrier #1. Note that the power control information is information that the radio base station 100a generates on the basis of the reception quality of the reverse link data to be transmitted by the carrier #1.

In step S15, the radio communication terminal 10 adjusts the transmission power of the reverse link data to be transmitted by using the carrier #1 through the closed loop control. Specifically, the radio communication terminal 10 adjusts the transmission power of the reverse link data determined in step 12, on the basis of the power control information received in step 14.

In step 16, the radio communication terminal 10 receives power control information for the carrier #2. Specifically, the radio communication terminal 10 receives the power control information from the radio base station 100b to which reverse link data is to be transmitted by using the carrier #2. Note that the power control information is information that the radio base station 100b generates on the basis of the reception quality of the reverse link data to be transmitted by the carrier #2.

In step 17, the radio communication terminal 10 adjusts the transmission power of the reverse link data to be transmitted by using the carrier #2 through the closed loop control. Specifically, the radio communication terminal 10 adjusts the transmission power of the reverse link data determined in step 13, on the basis of the power control information received in step 16.

In step 18, the radio communication terminal 10 determines a data rate of reverse link data to be transmitted by using the carrier #1, according to wireless condition (amount of delay, for example) between the radio communication terminal 10 and the radio base station 100a, to a type of application, or the like.

In step 19, the radio communication terminal 10 determines a data rate of reverse link data to be transmitted by using the carrier #2, according to wireless condition (amount of delay, for example) between the radio communication terminal 10 and the radio base station 100b, to a type of application, or the like.

In step 20, the radio communication terminal 10 determines an offset value of the carrier #1 referring to a table stored in the memory 19, and corresponding to the data rate determined in step 18. The radio communication terminal 10 transmits reverse link data by using carrier #1, with power resulting from addition of the offset value to the transmission power adjusted in step 15.

In step 21, the radio communication terminal 10 determines an offset value of the carrier #2 referring to a table stored in the memory 19, and corresponding to the data rate determined in step 19. The radio communication terminal 10 transmits reverse link data by using carrier #2, with power resulting from addition of the offset value to the transmission power adjusted in step 17.

Hereinafter, a sub-processing (1) of controlling transmission power will be described with reference to FIG. 7. Note that the sub-processing (1) of controlling transmission power is a processing which breaks into the main processing of controlling transmission power in a predetermined cycle.

As shown in FIG. 7, in step 30, the radio communication terminal 10 calculates a difference in transmission power (transmission power difference) of reverse link data between adjacent carriers (carrier #1 and carrier #2).

In step 31, the radio communication terminal 10 determines whether or not a transmission power difference between adjacent carriers exceeds a maximum transmission, power difference (MaxRLTxPwrDiff). When the transmission power difference between the adjacent carriers exceeds the maximum transmission power difference, the radio communication terminal 10 proceeds to the processing in step 32. In addition, when the transmission power difference between the adjacent carriers does not exceed the maximum transmission power difference, the radio communication terminal 10 terminates the sub-processing of controlling transmission power.

In step 32, the radio communication terminal 10 changes a data rate of reverse link data to be transmitted via one of the adjacent carriers that has lower transmission power. Specifically, the radio communication terminal 10 increases the data rate of the reverse link data to be transmitted via one of the adjacent carriers that has lower transmission power (first level in the table stored in the memory 19, for example).

In step 33, the radio communication terminal 10 changes an offset value of one of the adjacent carriers that has lower transmission power. Specifically, the radio communication terminal 10 increases the offset value in accordance with the data rate changed in step 32 (first level in the table stored in the memory 19, for example).

Lastly, a sub-processing (2) of controlling transmission power will be described with reference to FIG. 8. Note that similar to the sub-processing (1) of controlling transmission power, the sub-processing (2) of controlling transmission power is a processing which breaks into the main processing of controlling transmission power in a predetermined cycle.

As shown in FIG. 8, in step 40, the radio communication terminal 10 calculates a difference in transmission power (transmission power difference) of reverse link data for adjacent carriers (carrier #1 and carrier #2).

In step 41, the radio communication terminal 10 determines whether or not a transmission power difference between adjacent carriers exceeds a maximum transmission power difference (MaxRLTxPwrDiff). When the transmission power difference between the adjacent carriers exceeds the maximum transmission power difference, the radio communication terminal 10 proceeds to the processing in step 42. In addition, when the transmission power difference between the adjacent carriers does not exceed the maximum transmission power difference, the radio communication terminal 10 terminates the sub-processing of controlling transmission power.

In step 42, the radio communication terminal 10 changes a data rate of reverse link data to be transmitted via one of the adjacent carriers that has higher transmission power. Specifically, the radio communication terminal 10 decreases the data rate of the reverse link data to be transmitted via one of the adjacent carriers that has higher transmission power (first level in the table stored in the memory 19, for example).

In step 43, the radio communication terminal 10 changes an offset value of one of the adjacent carriers that has higher transmission power. Specifically, the radio communication terminal 10 decreases the offset value in accordance with the data rate changed in step 42 (first level in the table stored in the memory 19, for example).

(Action and Effect)

With the radio communication terminal 10 according to the first embodiment of the present invention, when the transmission power difference between the adjacent carriers exceeds a maximum transmission power difference (MaxRLTxPwrDiff), the communication controller 23 can reduce a transmission power difference between the adjacent carriers by reducing a data rate of one of the adjacent carriers that has the higher transmission power value.

In addition, when the transmission power difference between the adjacent carriers exceeds the maximum transmission power difference (MaxRLTxPwrDiff), the communication controller 23 can reduce the transmission power difference between the adjacent carriers by increasing a data rate of one of the adjacent carriers that has the lower transmission power value, while improving the data rate of one of the carriers with the lower transmission power value.

Thus, communications by multicarrier can be maintained while interference between adjacent carriers is controlled.

Second Embodiment

A second embodiment of the present invention will be described hereinafter. In the following, differences between the first embodiment described above and the second embodiment will be mainly described.

Specifically, in the first embodiment described above, the radio communication terminal 10 change a data rate of reverse link data and an offset value when a transmission power difference between adjacent carriers exceeds a maximum transmission power difference.

Different from this, in the second embodiment, the radio communication terminal 10 determines whether or not a transmission power difference between adjacent carriers is being expanding, and changes a data rate of reverse link data and an offset value when the transmission power difference between the adjacent carriers has a tendency to expand, and exceeds the maximum transmission power difference.
(Configuration of Radio Communication Terminals)

Figure 9:
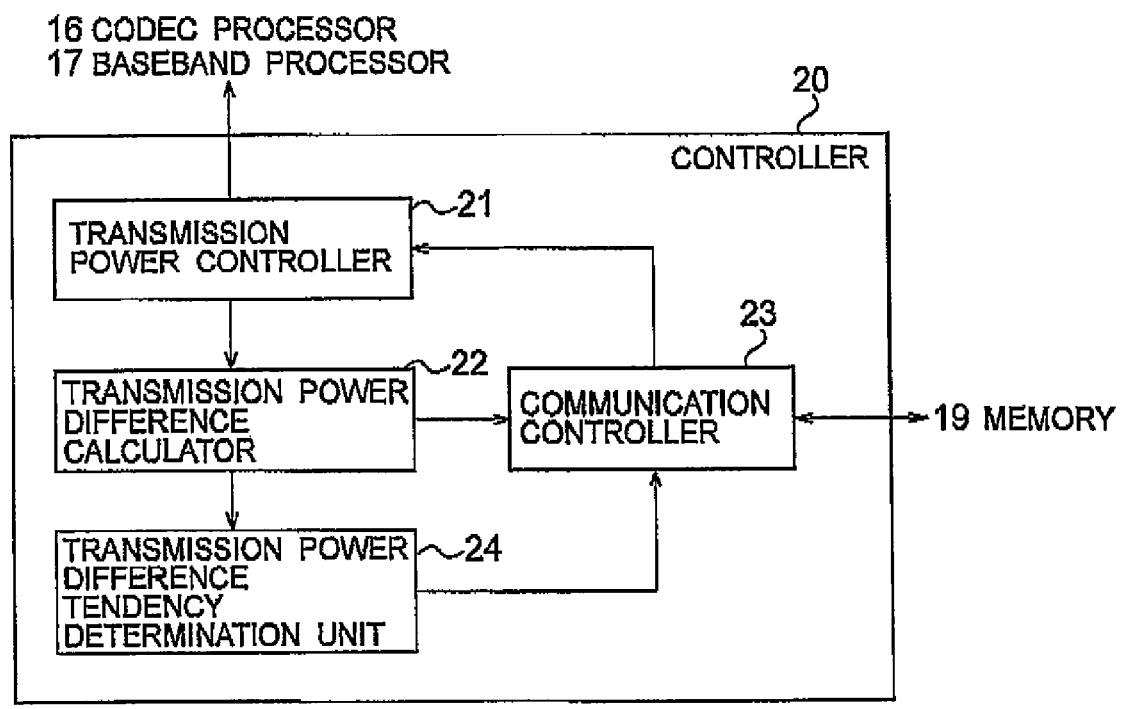
FIG. 9 is a functional block diagram of the controller 20 according to a second embodiment of the present invention.

A configuration of the radio communication terminals according to the second embodiment of the present invention will so be described hereinafter with reference to the drawings. FIG. 9 is a block configuration diagram showing the radio communication terminal 10 according to the second embodiment of the present invention. It should be noted that in FIG. 9, similar reference numerals are assigned to the configuration similar to FIG. 3.

As shown in FIG. 9, the radio communication terminal 10 includes a transmission power difference tendency determination unit 24, in addition to a transmission power controller 21, a transmission power difference calculator 22, and a communication controller 23.

The transmission power difference calculator 22 calculates a transmission power difference between adjacent carriers in predetermined cycle (cycle in which the transmission power is controller 21 performs transmission power control, for example).

The transmission power difference tendency determination unit 24 determines whether or not the transmission power difference between the adjacent carriers has expanded, the difference calculated by the transmission power difference calculator 22 in the predetermined cycle. Specifically, on the basis of the transmission power of the reverse link data, the transmission power difference tendency determination unit 24 calculates an expression of an estimated curve (hereinafter referred to as an estimated curve expression) for each adjacent carrier, the estimated curve expression showing a tendency of transmission power of the reverse link data to change on the time axis. Subsequently, the transmission power difference tendency determination unit 24 determines whether or not a difference in values Calculated by each of the estimated curve expressions (hereinafter referred to as an estimated curve difference) at a predetermined time exceeds an estimated curve difference threshold over a predetermined period. When the estimated curve difference between the adjacent carriers exceeds the estimated curve difference threshold over the predetermined period, the transmission power difference tendency determination unit 24 informs the communication controller 23 of the fact that the estimated curve difference between the adjacent carriers exceeds the estimated curve threshold over the predetermined period.

Figure 10:
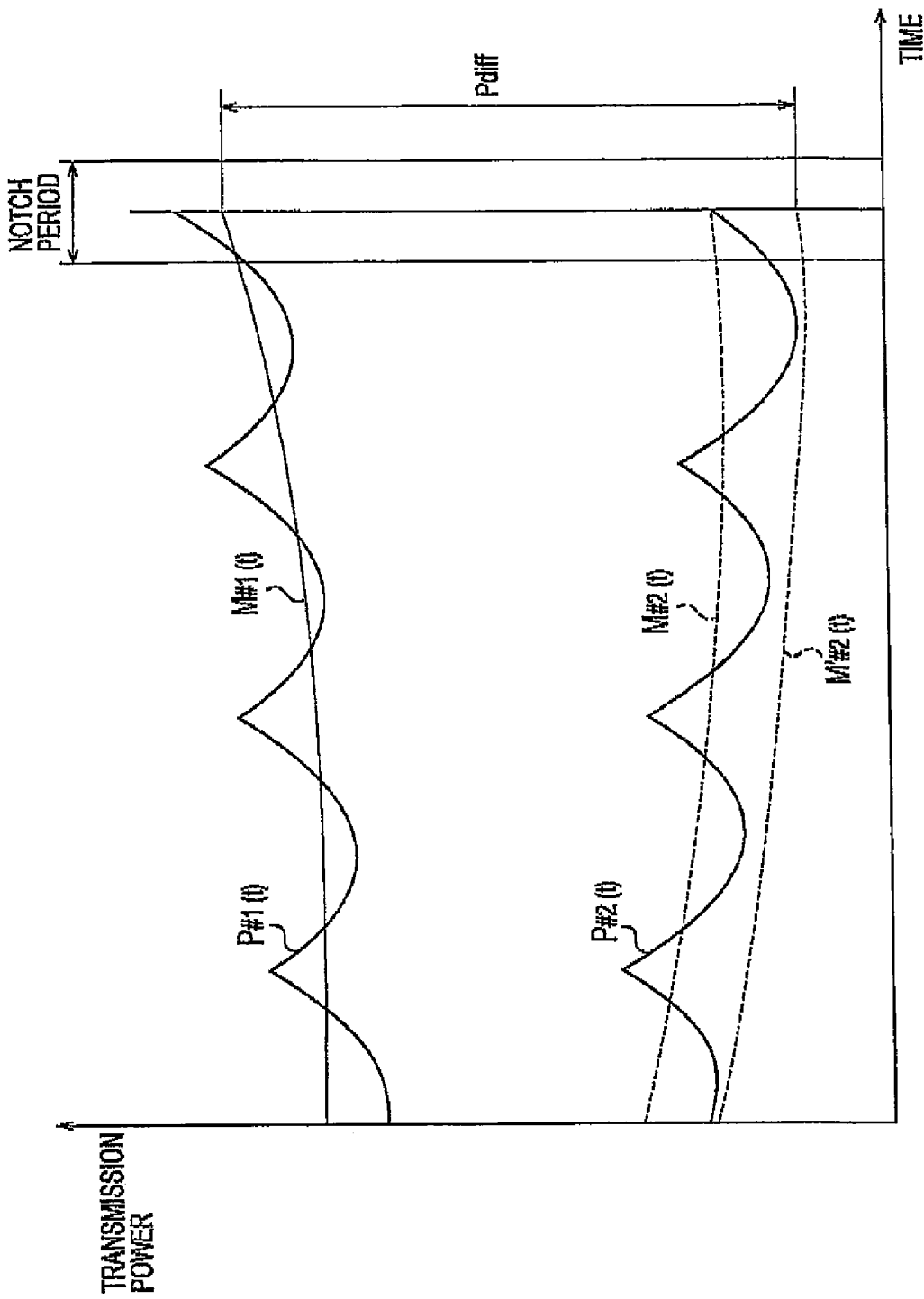
FIG. 10 is a view for illustrating calculation of an estimated curve difference according to the second embodiment of the present invention.

For example, using the case where adjacent carriers are a carrier #1 and a carrier #2 as an example, the procedure for calculating an estimated curve difference between the carrier #1 and the carrier #2 will be described with reference to FIG. 10. Hereinafter, considered is the case where transmission power of the carrier #1 is larger than that of the carrier #2.

Specifically, when the transmission power of the carrier #1 at time t is set as "$P_{\#1}(t)$", an estimated curve expression "$M_{\#1}(t)$" of the carrier #1 is calculated by the following expression (1) where α is a coefficient corresponding to the carrier #1:

[Formula 1]

$$M_{\#1}(t)=\alpha \cdot P_{\#1}(t)+(1-\alpha) \times M_{\#1}(t-\Delta t) \qquad \text{Expression (1)}$$

On the other hand, when the transmission power of the carrier #2 at the time t is set as "$P_{\#2}(t)$", an estimated curve expression "$M_{\#2}(t)$" of the carrier #2 is calculated by the following expression (2) where β is a coefficient corresponding to the carrier #2:

[Formula 2]

$$M_{\#2}(t)=\beta \times P_{\#2}(t)+(1-\beta) \times M_{\#2}(t-\Delta t) \qquad \text{Expression (2)}$$

Furthermore, for the carrier #2 having lower transmission power, a lower estimated curve expression "$M'_{\#2}(t)$" of the carrier #2 is calculated by the following expression (3):

[Formula 3]

$$M'_{\#2}(t)=M_{\#2}(t)-\max \{M_{\#2}(t+\Delta t)-P_{\#2}(t+\Delta t)\} \qquad \text{Expression (3)}$$

In addition, at the time t, a difference (estimated curve difference "$P_{diff}$") between a value calculated by the estimated is curve expression of the carrier #1 and a value calculated by the lower estimated curve expression of the carrier #2 is calculated by the following expression (4):

[Formula 4]

$$P_{diff}=M_{\#1}(t)-M_{\#2}(t) \qquad \text{Expression (4)}$$

Subsequently, the transmission power difference tendency determination unit 24 determines whether or not the estimated curve difference "$P_{diff}$" calculated by the expression (1) to the expression (4) exceeds the estimated curve difference threshold ($P_{thresh}$) for a predetermined period.

It is needless to say that an estimated curve difference "$P_{diff}$" may simply be a difference between a value calculated by the estimated curve expression "$M_{\#1}(t)$" and a value calculated by the estimated curve expression "$M_{\#2}(t)$", not a difference between a value calculated by the estimated curve expression "$M_{\#1}(t)$" and a value calculated by the lower estimated curve expression "$M'_{\#2}(t)$".

When the communication controller 23 is informed of the fact that an estimated curve difference between adjacent carriers has exceeded an estimated curve difference threshold for a predetermined period and that a transmission power difference between adjacent carriers has exceeded a maximum transmission power difference, the communication controller 23 changes a data rate of a reverse link signal and determines an offset value according to the changed data rate referring to a table stored in the memory 19.
(Operation of Radio Communication Terminals)

Figure 11:
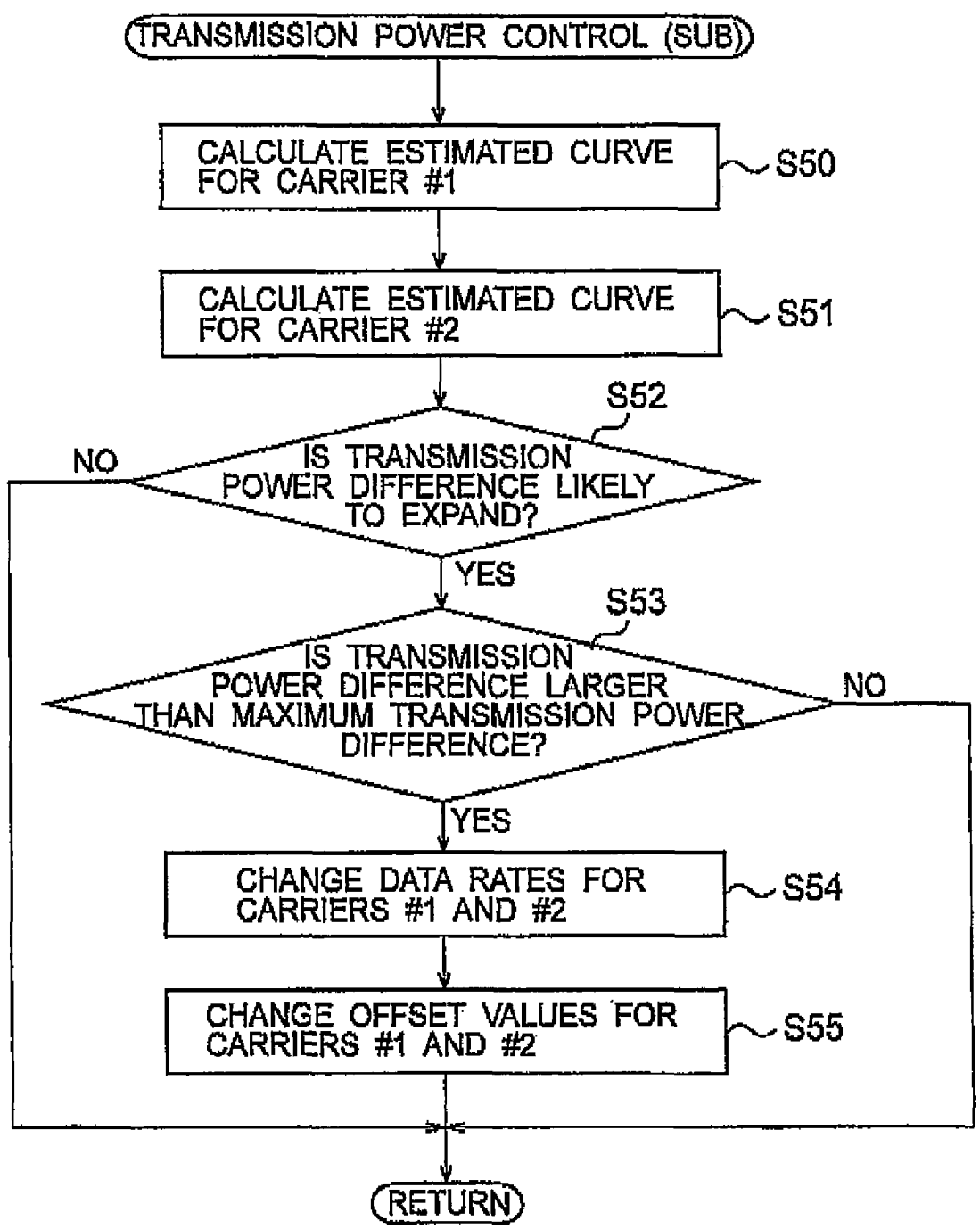
FIG. 11 is a flowchart showing operation of the radio communication terminal 10 according to the second embodiment of the present invention.

The operation of the radio communication terminal according to the second embodiment of the present invention will be described hereinafter with reference to the drawings. FIG. 11 is a flowchart of the operation of the radio communication terminal 10 according to the second embodiment of the present invention. A sub-processing of controlling transmission power shown in FIG. 11 is performed instead of the sub-processing of controlling transmission power shown in FIG. 7 and FIG. 8 as described above.

Hereinafter, as is the case of the first embodiment as described above, the case where adjacent carriers are a carrier #1 and a carrier #2 will be described as an example. In addition, so the radio communication terminal 10 is assumed to transmit reverse link data to the radio base station 100a by using the carrier #1 and transmit reverse link data to the radio base station 100*b* by using the carrier #2. Furthermore, transmission power of the carrier #1 is assumed to be larger than that of the carrier #2.

As shown in FIG. 11, in step 50, the radio communication terminal 10 calculates an estimated curve expression of the carrier #1 on the basis of the transmission power of the reverse link data to be transmitted via the carrier #1 with higher w transmission power.

In step 51, the radio communication terminal 10 calculates an estimated curve expression (or a lower estimated curve expression) of the carrier #2 on the basis of the transmission power of the reverse link data to be transmitted via the carrier #2 with lower transmission power.

In step 52, based on the estimated curve expression of the carrier #1 calculated in step 50 and the estimated curve expression (or the lower estimated curve expression) of the carrier #2 calculated in step 51, the radio communication terminal 10 determines whether or not a transmission power difference between the carrier #1 and the carrier #2 is likely to expand. Specifically, the radio communication terminal 10 calculates a difference (estimated curve difference) between a value calculated by the estimated curve expression of the carrier #1 and a value calculated by the estimated curve expression (or the lower estimated curve expression) of the carrier #2. Subsequently, the radio communication terminal 10 determines whether or not the estimated curve difference has exceeded an estimated curve difference threshold over a predetermined period.

In addition, when the estimated curve difference has exceeded the estimated curve difference threshold over the predetermined period, the radio communication terminal 10 determines that the transmission power difference is likely to expand, and proceeds to the processing of step 53. In contrast, when the estimated curve difference has not exceeded the estimated curve difference threshold over the predetermined period, the radio communication terminal 10 determines that the transmission power difference is unlikely to expand and terminates the sub-processing of controlling transmission power.

In step 53, the radio communication terminal 10 determines whether or not the transmission power difference between the carrier #1 and the carrier #2 exceeds the maximum transmission power difference. When the transmission power difference exceeds the maximum transmission power difference, the radio communication terminal 10 proceeds to the processing of step 54. When the transmission power difference does not exceed the maximum transmission power difference, the radio communication terminal 10 terminates the sub-processing of controlling transmission power.

In step 54, the radio communication terminal 10 changes data rates of reverse link data to be transmitted respectively by using the carrier #1 and the carrier #2. Specifically, the radio communication terminal 10 increases the data rate of the so reverse link data to be transmitted via the carrier #2, of the adjacent carriers, with lower transmission power (first level in the table stored in the memory 19, for example). The radio communication terminal 10 may also reduce the data rate of the reverse link data to be transmitted via the carrier 4#1, of the adjacent carriers, with higher transmission power (first level in the table stored in the memory 19, for example).

In step 55, the radio communication terminal 10 determines offset values for the carrier #1 and the carrier #2 corresponding to the data rates determined in step 54.

(Action and Effect)

With the radio communication terminal 10 according to the second embodiment of the present invention, the communication is controller 23 changes an offset value in accordance with changed data rate of each of adjacent carriers, not simply in the case where a transmission power difference between adjacent carriers exceeds a maximum transmission power difference, but in the case where the transmission power difference between the adjacent carriers is likely to expand, and exceeds the maximum transmission power difference.

Now, considered is a case where transmission power of the carrier temporarily increases through the open loop control or the closed loop control, as a result of deterioration of reception quality due to effect of fading, or the like. In such the case, even if the transmission power difference between the adjacent carriers temporarily exceeds a maximum transmission power difference, the transmission power difference between the adjacent carriers is likely to fall within the maximum transmission power difference when the effect of fading or the like is cleared.

In the second embodiment of the present invention, in such the case where the transmission power difference between the adjacent carriers temporarily exceeds the maximum transmission power difference, unnecessary performance of data control can be prevented.

Third Embodiment

A third embodiment of the present invention will be described hereinafter. In the following, differences between the first embodiment described above and the third embodiment will be mainly described.

Specifically, in the first embodiment as described above, the radio communication terminal 10 changes a data rate of reverse link data and an offset value when a transmission power difference between adjacent carriers exceeds a maximum transmission power difference.

In contrast, in the third embodiment, the radio communication terminal 10 changes a date rate of reverse link data and an offset value considering not only a transmission power difference between adjacent carriers but also a difference in data rates between the adjacent carriers.

(One Example of Carrier Control)

One example of carrier control according to the third embodiment of the present invention will be described hereinafter with reference to the drawings. FIG. 12 to FIG. 15 show an example of carrier control according to the third embodiment of the present invention. In FIG. 12 to FIG. 15, the description is given of a case where the adjacent carriers are carrier #1 and carrier #2 as an example. Note that the carrier control also includes a handoff processing besides the data rate control (i.e. offset value control) of the reverse link data FIG. 12(*a*) to FIG. 15(*a*) show data rates and transmission powers of adjacent carriers before carrier control. Additionally, FIG. 12(*b*) to FIG. 15(*b*) show the data rates and the transmission powers of the adjacent carriers after the carrier control. Hereinafter, a first rate difference threshold is assumed to be larger than a second rate difference threshold.

As shown in FIG. 12(*a*), the data rate of the carrier #2 is higher than that of the carrier #1, and the transmission power of the carrier #2 is also higher than that of the carrier #1. Additionally, a value (data rate difference) obtained by subtracting the data rate of the carrier #1 with lower transmission power from the data rate of the carrier #2 with higher transmission power exceeds a first rate difference threshold.

Now, a difference (transmission power difference) between the transmission power of the carrier #1 and the transmission power of the carrier #2 exceeds the maximum transmission power difference, so that carrier control is needed. Thus, as shown in FIG. 12(b), carrier control is performed in a way that the data rate of the carrier #1 is increased, while the data rate so of the carrier #2 is reduced.

This uniformizes transmission power difference between the adjacent carriers as well as data rates between the adjacent carriers.

As shown in FIG. 13(a), although the data rate of the carrier #2 is lower than that of the carrier #1, the transmission power of the carrier #2 is higher than that of the carrier #1. In addition, a value obtained by subtracting the data rate of the carrier #1 with lower transmission power from the data rate of the carrier #2 with higher transmission power is smaller than the second rate difference threshold (the second rate difference threshold<the first rate difference threshold). It should be noted that since the data rate difference is a value obtained by subtracting the data rate of the carrier with lower transmission power from the data rate of the carrier with higher transmission power, the data rate difference is a negative value in FIG. 13(a).

Now, since the difference (transmission power difference) between the transmission power of the carrier #1 and the transmission power of the carrier #2 exceeds the maximum transmission power difference, carrier control is needed. Thus, as shown in FIG. 13(b), a handoff processing of the carrier #2 with higher transmission power is performed.

This can avoid a situation where the transmission power difference between the adjacent carriers exceeds the maximum transmission power difference. In addition, this can improve communication quality as an entire multicarrier communication in which multiple carriers are bundled and used in a upper layer, by maintaining the carrier #1 that is efficient in view of the relation between the transmission power and the data rate, and by stopping the use of the carrier 12 that is inefficient in view of the relation between the transmission power and the data rate.

In other words, even though the carrier #2 that is inefficient in view of the relation between the transmission power and the data rate is stopped being used, it does not largely affects the communication quality of the entire multicarrier communications. Accordingly, the priority is given to the solution of the interference between the adjacent carriers.

As shown in FIG. 14(a), the data rate of the carrier #2 is almost equal to that of the carrier #1, and the transmission power of the carrier 12 is higher than that of the carrier #1. In addition, a value (data rate difference) obtained by subtracting the data rate of the carrier #1 with lower transmission power from the data rate of the carrier #2 with higher transmission power is not less than the second rate difference threshold, as well as not more than the first rate difference threshold. Additionally, the data rate of the carrier #2 with higher transmission power is lower than the predetermined data rate threshold.

Now, since the difference (transmission power difference) between the transmission power of the carrier 11 and that of the carrier #2 exceeds the maximum transmission power difference, carrier control is required. Thus, as shown in FIG. 14(b), the handoff processing for the carrier #2 with higher transmission power is performed, as well as data rate control is performed to increase the data rate of the carrier #1 with lower transmission power.

This can avoid a situation where the transmission power difference between the adjacent carriers exceeds the maximum transmission power difference. In addition, communication quality of the entire multicarrier communications in which multiple carriers are bundled and used in a upper layer can be improved by increasing the data rate of the carrier #1 that is efficient, and by stopping the use of the carrier #2 that is inefficient in view of the relation between the transmission power and the data rate.

In other words, as the entire multicarrier communications, reverse link data amount that decreases after stopping the use of the carrier #2 that is inefficient in view of the relationship between the transmission power and the data rate can be compensated for by increasing the data rate of the carrier #1.

As shown in FIG. 15(a), the data rate of the carrier #2 is almost equal to that of the carrier #1, and the transmission power of the carrier #2 is higher than that of the carrier #1. A value (data rate difference) obtained by subtracting the data rate of the carrier #1 with lower transmission power from the data rate of the carrier #2 with higher transmission power is not less than the second rate difference threshold and not more than the first rate difference threshold. In addition, the data rate of the carrier #2 with higher transmission power is not less than the predetermined data rate threshold.

Now, since the difference (transmission power difference) between the transmission power of the carrier #1 and the transmission power of the carrier #2 exceeds the maximum transmission power difference, thus carrier control is required. Thus, as shown in FIG. 15(b), the carrier control is performed in which the data rate of the carrier #2 with higher transmission power is reduced.

This can avoid a situation where the transmission power difference between the adjacent carriers exceeds the maximum transmission power difference.

(Operation of Radio Communication Terminal 10)

Figure 16:
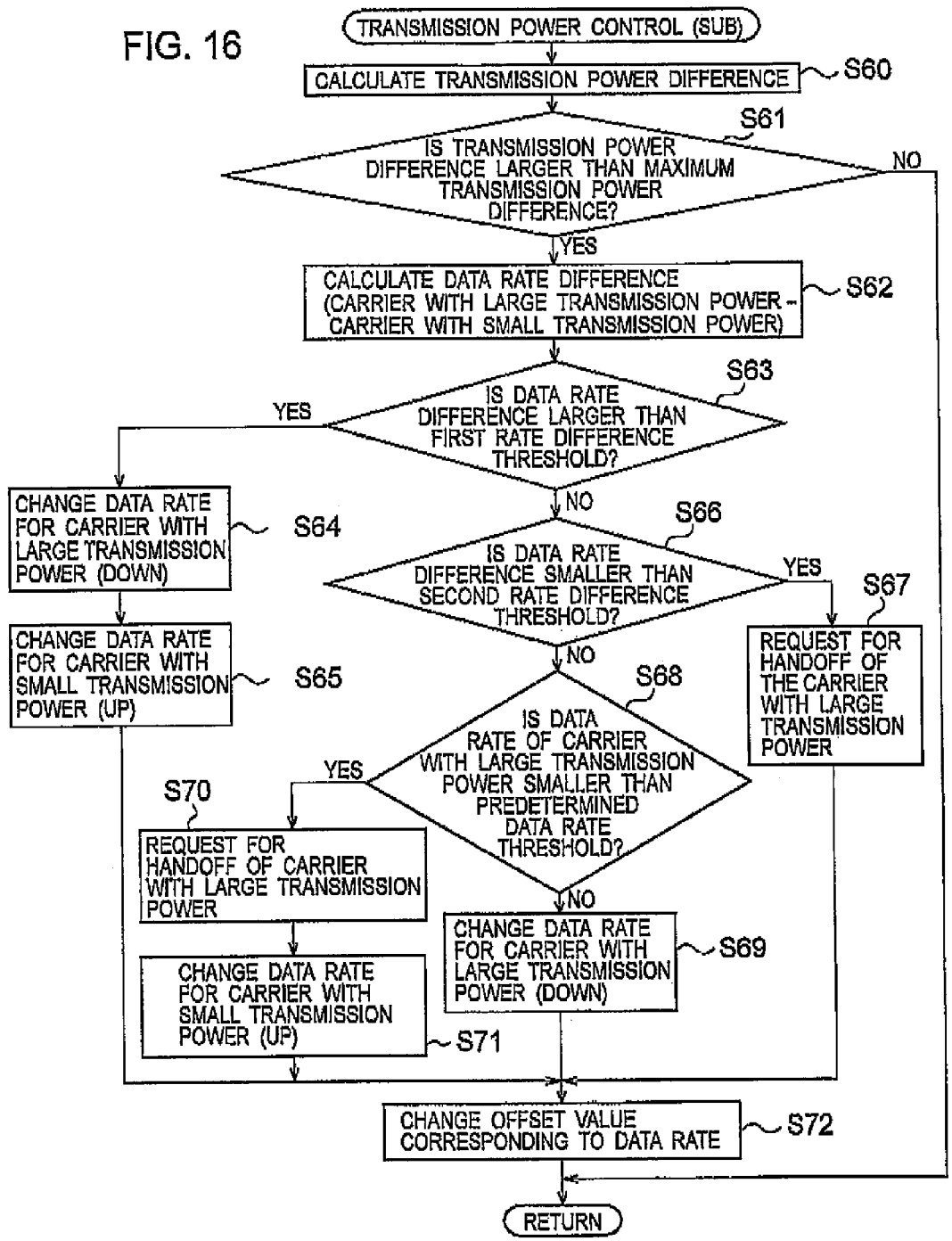
FIG. 16 is a flowchart showing operation of the radio communication terminal 10 according to the third embodiment of the present invention.

The operation of the radio communication terminal according to the third embodiment of the present invention will be described hereinafter with reference to the drawings. FIG. 16 is a flowchart showing the operation of the radio communication terminal 10 according to the third embodiment of the present invention. A sub-processing of controlling transmission power shown in FIG. 16 is performed instead of the sub-processing of controlling transmission power shown in FIG. 7 and FIG. 8 as described above.

As shown in FIG. 16, in step 60, the radio communication terminal 10 calculates a difference (transmission power difference) in transmission power of reverse link data between adjacent carriers (a carrier #1 and a carrier #2, for example).

In step 61, the radio communication terminal 10 determines whether or not the transmission power difference between the adjacent carriers exceeds a maximum transmission power difference (MaxRLTxPwrDiff). When the transmission power difference between the adjacent carriers exceeds the maximum transmission power difference, the radio communication terminal 10 proceeds to the processing in step 62. In addition, when the transmission power difference between the adjacent carriers does not exceeds the maximum transmission power difference, the radio communication terminal 10 terminates the sub-processing of controlling transmission power.

In step 62, the radio communication terminal 10 calculates a value obtained by subtracting the data rate of the carrier with lower transmission power from the data rate of the carrier with higher transmission power, as a data rate difference.

In step 63, the radio communication terminal 10 determines whether or not the data rate difference calculated in step 62 exceeds the first rate difference threshold. When the data rate difference between the adjacent carriers exceeds the first rate difference threshold, the radio communication terminal 10 proceeds to the processing in step 64. When the data rate difference does not exceed the first rate difference threshold, the radio communication terminal 10 proceeds to the processing in step 66.

In step 64, the radio communication terminal 10 reduces the data rate of one of the adjacent carriers that has higher transmission power (first level in the table stored in the memory 19, for example).

In step 65, the radio communication terminal 10 increases the data rate of one of the adjacent carriers that has lower transmission power (first level in the table stored in the memory 19, for example). The processings in step 64 and step 65 are similar to the control shown in FIG. 12.

In step 66, the radio communication terminal 10 determines whether or not the data rate difference calculated in step 62 is smaller than the second rate difference threshold (the second rate difference threshold<the first rate difference threshold). When the data rate difference between the adjacent carriers is smaller than the second rate difference threshold, the radio communication terminal 10 proceeds to the processing in step 67. In addition, when the data rate difference is not smaller than the second rate difference threshold, the radio communication terminal 10 proceeds to the processing of step 68.

In step 67, the radio communication terminal 10 requests as for handoff of one of the adjacent carriers that has higher transmission power. The processing in step 67 is similar to the control shown in FIG. 13.

In step 68, the radio communication terminal 10 determines whether or not the data rate of the carrier with higher transmission power is smaller than the predetermined data rate threshold. When the data rate of the carrier with higher transmission power is lower than the predetermined data rate threshold, the radio communication terminal 10 returns to the so processing in step 70. In addition, when the data rate of the carrier with higher transmission power is not lower than the predetermined data rate threshold, the radio communication terminal 10 proceeds to the processing in step 69.

In step 69, the radio communication terminal 10 reduces the data rate of one of the adjacent carriers that has higher transmission power (first level in the table stored in the memory 19, for example). Note that the processing in step 69 is similar to the control shown in FIG. 15.

In step 70, the radio communication terminal 10 requests for handoff of one of the adjacent carriers that has higher transmission power.

In step 71, the radio communication terminal 10 increases the data rate of one of the adjacent carriers that has smaller transmission power. Note that the processings in step 70 and step 71 are similar to the control shown in FIG. 14.

In step 72, the radio communication terminal 10 changes offset values in accordance with the changed data rates in the respective processings (step 64, step 65, step 69 or step 71).
(Action and Effect)

With the radio communication terminal 10 according to the third embodiment of the present invention, the communication controller 23 changes the data rate of the reverse link data and the offset value in consideration of the data rate with respect to the transmission power of each one of the adjacent carriers.

Thus, a situation where the transmission power difference between the adjacent carriers exceeds the maximum transmission power difference can be avoided, thus the improvement is achieved in the communication quality of the entire multicarrier communications in which multiple carriers are bundled and used in the upper layer.

Other Embodiments

As described above, content of the present invention was disclosed through one embodiment of the present invention. However, it should not be construed that the description and drawings constituting a part of this disclosure will limit the present invention. Various alternative embodiments will be apparent to those skilled in the art from this disclosure.

For example, in the first embodiment to the third embodiment as described above, a data rate of reverse link data is controlled on the basis of the determination as to whether or not the transmission power difference between the adjacent carriers exceeds the maximum transmission power difference. However, the present invention shall not be limited to this.

Specifically, a data rate of reverse link data may be controlled on the basis of the determination as to whether or not a transmission power difference of two carriers being not adjacent to each other exceeds a predetermined threshold.

In this case, a predetermined threshold is defined in accordance with the distance between center frequencies of the two carriers being apart from each other. Specifically, as the center frequencies of the two carries are apart from each other farther, the two carriers interfere with each other to a lower extent. Thus, the predetermined threshold is defined at a low value.

In addition, the operation of the radio communication terminal 10 according to the first to third embodiments as described above can be provided as an executable program in a computer.

In this way, it is needless to say that the present invention contains various embodiments that have not been described herein. Thus, a technical scope of the present invention shall be defined only by inventive specific matters according to the claims that are reasonable from the above description.

The content of Japanese Patent Application No. 2006-180355 (filed on Jun. 29, 2006) is incorporated herein by reference in its entirety.

INDUSTRIAL APPLICABILITY

As described above, the radio communication method and the radio communication terminals according to the present invention can maintain communications by multicarrier while controlling interference between adjacent carries which are adjacent to each other with a predetermined frequency interval. Accordingly, they are useful in radio communications such as mobile communications.

The invention claimed is:

1. A radio communication method in reverse link by multicarrier using at least a first carrier and a second carrier that is adjacent to the first carrier with a predetermined frequency interval, wherein
 a transmission power value of the first carrier is set to decrease in accordance with decrease in a data rate of data to be transmitted via the first carrier, and a transmission power value of the second carrier is set to decrease in accordance with decrease in a data rate of data to be transmitted via the second carrier,
 the radio communication method comprising performing in a radio communication terminal the steps of:
 calculating a transmission power difference between the transmission power value of the first carrier and the transmission power value of the second carrier;
 determining whether or not the transmission power difference exceeds a threshold which indicates a maximum transmission power difference allowable between the first carrier and the second carrier; and
 decreasing the data rate for transmission via one of the first carrier and the second carrier that has the higher transmission power value, when the transmission power difference exceeds the maximum transmission power difference.

2. The radio communication method according to claim 1, wherein
in the step of calculating the transmission power difference, the transmission power difference is calculated in a predetermined cycle,
the radio communication method further comprising the steps of:
determining whether or not the transmission power difference has been expanding, on the basis of the transmission power difference calculated in the predetermined cycle; and
decreasing the data rate for transmission via one of the first carrier and the second carrier that has the higher value of the transmission power, when it is determined that the transmission power difference has been expanding.

3. A radio communication method in reverse link by multicarrier using at least a first carrier and a second carrier that is adjacent to the first carrier with a predetermined frequency interval, wherein
a transmission power value of the first carrier is set to increase in accordance with increase in a data rate of data to be transmitted via the first carrier, and a transmission power value of the second carrier is set to increase in accordance with increase in a data rate of data to be transmitted via the second carrier,
the radio communication method comprising the steps of:
calculating a transmission power difference between the transmission power value of the first carrier and the transmission power value of the second carrier;
determining whether or not the transmission power difference exceeds a threshold which indicates a maximum transmission power difference allowable between the first carrier and the second carrier; and
increasing the data rate for transmission via one of the first carrier and the second carrier that has the lower transmission power value, when the transmission power difference exceeds the maximum transmission power difference.

4. The radio communication method according to claim 3, wherein
in the step of calculating the transmission power difference, the transmission power difference is calculated in a predetermined cycle,
the radio communication method further comprising the steps of:
determining whether or not the transmission power difference has been expanding, on the basis of the transmission power difference calculated in the predetermined cycle; and
increasing the data rate for transmission via one of the first carrier and the second carrier that has the lower transmission power value, when it is determined that the transmission power difference has been expanding.

5. The radio communication method according to any one of claim 1 and claim 3, further comprising a step of:
controlling a data rate of any one of the first carrier and the second carrier, on the basis of the data rate of the first carrier corresponding to the transmission power value of the first carrier and the data rate of the second carrier corresponding to the transmission power value of the second carrier.

6. A radio communication terminal for performing communications by multicarrier using at least a first carrier and a second carrier that is adjacent to the first carrier with a predetermined frequency interval, wherein
a transmission power value of the first carrier is set to decrease in accordance with decrease in a data rate of data to be transmitted via the first carrier, and a transmission power value of the second carrier is set to decrease in accordance with decrease in a data rate of data to be transmitted via the second carrier,
the radio communication terminal comprising:
a transmission power difference calculator configured to calculate a transmission power difference between the transmission power value of the first carrier and the transmission power value of the second carrier;
a transmission power difference determination unit configured to determine whether or not the transmission power difference calculated by the transmission power difference calculator exceeds a maximum transmission power difference allowable between the first carrier and the second carrier; and
a communication controller configured to decrease the data rate for transmission via one of the first carrier and the second carrier that has the higher transmission power value, when the transmission power difference determination unit determines that the transmission power difference exceeds the maximum transmission power difference.

7. The radio communication terminal according to claim 6, wherein
the transmission power difference calculator calculates the transmission power difference in a predetermined cycle,
the radio communication terminal further comprising
a power difference tendency determination unit configured to determine whether or not the transmission power difference has been expanding, on the basis of the transmission power difference calculated by the transmission power difference calculator in the predetermined cycle, wherein
the communication controller decreases the data rate for transmission via one of the first carrier and the second carrier that has the higher transmission power value, when the power difference tendency determination unit determines that the transmission power difference has been expanding.

8. A radio communication terminal for performing communications by multicarrier using at least a first carrier and a second carrier that is adjacent to the first carrier with a predetermined frequency interval, wherein
a transmission power value of the first carrier is set to increase in accordance with increase in a data rate of data to be transmitted via the first carrier, and a transmission power value of the second carrier is set to increase in accordance with increase in a data rate of data to be transmitted via the second carrier,
the radio communication terminal comprising:
a transmission power difference calculator configured to calculate a transmission power difference between the transmission power value of the first carrier and the transmission power value of the second carrier;
a transmission power difference determination unit configured to determine whether or not the transmission power difference calculated by the transmission power difference calculator exceeds a maximum transmission power difference allowable between the first carrier and the second carrier; and
a communication controller configured to increase the data rate for transmission via one of the first carrier and the second carrier that has the lower transmission power value, when the transmission power difference determination unit determines that the transmission power difference exceeds the maximum transmission power difference.

9. The radio communication terminal according to claim 8, wherein the transmission power difference calculator calculates the transmission power difference in a predetermined cycle, the radio communication terminal further comprising a power difference tendency determination unit configured to determine whether or not the transmission power difference has been expanding, on the basis of the transmission power difference calculated by the transmission power difference calculator in the predetermined cycle, wherein the communication controller increases the data rate for transmission via one of the first carrier and the second carrier that has the lower transmission power value, when the power difference tendency determination unit determines that the transmission power difference has been expanding.

10. The radio communication terminal according to any one of claim 6 and claim 8, wherein the communication controller controls a data rate of any one of the first carrier and the second carrier, on the basis of the data rate of the first carrier corresponding to the transmission power value of the first carrier and the data rate of the second carrier corresponding to the transmission power value of the second carrier.

\* \* \* \* \*